United States Patent
Zhao et al.

(10) Patent No.: US 8,238,298 B2
(45) Date of Patent: Aug. 7, 2012

(54) PICKING AN OPTIMAL CHANNEL FOR AN ACCESS POINT IN A WIRELESS NETWORK

(75) Inventors: Shiwei Zhao, Pleasanton, CA (US); Matthew S. Gast, Pleasanton, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 238 days.

(21) Appl. No.: 12/210,917

(22) Filed: Sep. 15, 2008

(65) Prior Publication Data

US 2010/0067379 A1 Mar. 18, 2010

Related U.S. Application Data

(60) Provisional application No. 61/190,576, filed on Aug. 29, 2008.

(51) Int. Cl.
*H04W 4/00* (2009.01)
*H04W 72/00* (2009.01)
*H04B 7/00* (2006.01)

(52) U.S. Cl. ........ 370/329; 370/310; 370/332; 455/450; 455/452.2; 455/453

(58) Field of Classification Search ........... 370/310, 370/332, 329; 455/450, 452.2, 453
See application file for complete search history.

(56) References Cited

U.S. PATENT DOCUMENTS

| | | | |
|---|---|---|---|
| 3,641,433 A | 2/1972 | Mifflin et al. | |
| 4,168,400 A | 9/1979 | de Couasnon et al. | |
| 4,176,316 A | 11/1979 | DeRosa et al. | |
| 4,247,908 A | 1/1981 | Lockhart, Jr. et al. | |
| 4,291,401 A | 9/1981 | Bachmann | |
| 4,291,409 A | 9/1981 | Weinberg et al. | |
| 4,409,470 A | 10/1983 | Shepard et al. | |
| 4,460,120 A | 7/1984 | Shepard et al. | |
| 4,475,208 A | 10/1984 | Ricketts | |
| 4,494,238 A | 1/1985 | Groth, Jr. | |
| 4,500,987 A | 2/1985 | Hasegawa | |
| 4,503,533 A | 3/1985 | Tobagi et al. | |
| 4,550,414 A | 10/1985 | Guinon et al. | |
| 4,562,415 A | 12/1985 | McBiles | |
| 4,630,264 A | 12/1986 | Wah et al. | |
| 4,635,221 A | 1/1987 | Kerr | |
| 4,639,914 A | 1/1987 | Winters | |
| 4,644,523 A | 2/1987 | Horwitz | |
| 4,672,658 A | 6/1987 | Kavehrad et al. | |
| 4,673,805 A | 6/1987 | Shepard et al. | |
| 4,707,839 A | 11/1987 | Andren et al. | |

(Continued)

FOREIGN PATENT DOCUMENTS

EP 0 992 921 A2 4/2000

(Continued)

OTHER PUBLICATIONS

Co-pending U.S. Appl. No. 11/648,359, filed Dec. 28, 2006.

(Continued)

*Primary Examiner* — Kwang B Yao
*Assistant Examiner* — Adam Duda

(57) ABSTRACT

A novel technique involves evaluating a real-time environment of a channel based on a nonlinear function of the number of neighbor radios and channel utilization requirements. The technique can be used to pick a channel for an AP that is added to a wireless network or to tune a channel for an existing AP. The technique can be applied to, for example, a relatively new wideband option in the 802.11n standard.

17 Claims, 7 Drawing Sheets

U.S. PATENT DOCUMENTS

| | | | |
|---|---|---|---|
| 4,730,340 A | 3/1988 | Frazier, Jr. | |
| 4,736,095 A | 4/1988 | Shepard et al. | |
| 4,740,792 A | 4/1988 | Sagey et al. | |
| 4,758,717 A | 7/1988 | Shepard et al. | |
| 4,760,586 A | 7/1988 | Takeda | |
| 4,789,983 A | 12/1988 | Acampora et al. | |
| 4,829,540 A | 5/1989 | Waggener, Sr. et al. | |
| 4,850,009 A | 7/1989 | Zook et al. | |
| 4,872,182 A | 10/1989 | McRae et al. | |
| 4,894,842 A | 1/1990 | Broekhoven et al. | |
| 4,901,307 A | 2/1990 | Gilhousen et al. | |
| 4,933,952 A | 6/1990 | Albrieux et al. | |
| 4,933,953 A | 6/1990 | Yagi | |
| 4,955,053 A | 9/1990 | Siegmund | |
| 4,995,053 A | 2/1991 | Simpson et al. | |
| 5,008,899 A | 4/1991 | Yamamoto | |
| 5,027,343 A | 6/1991 | Chan et al. | |
| 5,029,183 A | 7/1991 | Tymes | |
| 5,103,459 A | 4/1992 | Gilhousen et al. | |
| 5,103,461 A | 4/1992 | Tymes | |
| 5,109,390 A | 4/1992 | Gilhousen et al. | |
| 5,119,502 A | 6/1992 | Kallin et al. | |
| 5,142,550 A | 8/1992 | Tymes | |
| 5,151,919 A | 9/1992 | Dent | |
| 5,157,687 A | 10/1992 | Tymes | |
| 5,187,575 A | 2/1993 | Lim | |
| 5,231,633 A | 7/1993 | Hluchyj et al. | |
| 5,280,498 A | 1/1994 | Tymes et al. | |
| 5,285,494 A | 2/1994 | Sprecher et al. | |
| 5,329,531 A | 7/1994 | Diepstraten et al. | |
| 5,339,316 A | 8/1994 | Diepstraten | |
| 5,371,783 A | 12/1994 | Rose et al. | |
| 5,418,812 A | 5/1995 | Reyes et al. | |
| 5,444,851 A | 8/1995 | Woest | |
| 5,448,569 A | 9/1995 | Huang et al. | |
| 5,450,615 A | 9/1995 | Fortune et al. | |
| 5,465,401 A | 11/1995 | Thompson | |
| 5,479,441 A | 12/1995 | Tymes et al. | |
| 5,483,676 A | 1/1996 | Mahany et al. | |
| 5,488,569 A | 1/1996 | Kaplan et al. | |
| 5,491,644 A | 2/1996 | Pickering et al. | |
| 5,517,495 A | 5/1996 | Lund et al. | |
| 5,519,762 A | 5/1996 | Bartlett | |
| 5,528,621 A | 6/1996 | Heiman et al. | |
| 5,542,100 A | 7/1996 | Hatakeyama | |
| 5,546,389 A | 8/1996 | Wippenbeck et al. | |
| 5,561,841 A | 10/1996 | Markus | |
| 5,568,513 A | 10/1996 | Croft et al. | |
| 5,570,366 A | 10/1996 | Baker et al. | |
| 5,584,048 A | 12/1996 | Wieczorek | |
| 5,598,532 A | 1/1997 | Liron | |
| 5,630,207 A | 5/1997 | Gitlin et al. | |
| 5,640,414 A | 6/1997 | Blakeney, II et al. | |
| 5,649,289 A | 7/1997 | Wang et al. | |
| 5,668,803 A | 9/1997 | Tymes et al. | |
| 5,677,954 A | 10/1997 | Hirata et al. | |
| 5,706,428 A | 1/1998 | Boer et al. | |
| 5,715,304 A | 2/1998 | Nishida et al. | |
| 5,729,542 A | 3/1998 | Dupont | |
| 5,734,699 A | 3/1998 | Lu et al. | |
| 5,742,592 A | 4/1998 | Scholefield et al. | |
| 5,774,460 A | 6/1998 | Schiffel et al. | |
| 5,793,303 A | 8/1998 | Koga | |
| 5,794,128 A | 8/1998 | Brockel et al. | |
| 5,812,589 A | 9/1998 | Sealander et al. | |
| 5,815,811 A | 9/1998 | Pinard et al. | |
| 5,828,653 A | 10/1998 | Goss | |
| 5,828,960 A | 10/1998 | Tang et al. | |
| 5,835,061 A | 11/1998 | Stewart | |
| 5,838,907 A | 11/1998 | Hansen | |
| 5,844,900 A | 12/1998 | Hong et al. | |
| 5,852,722 A | 12/1998 | Hamilton | |
| 5,862,475 A | 1/1999 | Zicker et al. | |
| 5,872,968 A | 2/1999 | Knox et al. | |
| 5,875,179 A | 2/1999 | Tikalsky | |
| 5,887,259 A | 3/1999 | Zicker et al. | |
| 5,896,561 A | 4/1999 | Schrader et al. | |
| 5,909,686 A | 6/1999 | Muller et al. | |
| 5,915,214 A | 6/1999 | Reece et al. | |
| 5,920,821 A | 7/1999 | Seazholtz et al. | |
| 5,933,607 A | 8/1999 | Tate et al. | |
| 5,938,721 A | 8/1999 | Dussell et al. | |
| 5,949,988 A | 9/1999 | Feisullin et al. | |
| 5,953,669 A | 9/1999 | Stratis et al. | |
| 5,960,335 A | 9/1999 | Umemoto et al. | |
| 5,969,678 A | 10/1999 | Stewart | |
| 5,970,066 A | 10/1999 | Lowry et al. | |
| 5,977,913 A | 11/1999 | Christ | |
| 5,980,078 A | 11/1999 | Krivoshein et al. | |
| 5,982,779 A | 11/1999 | Krishnakumar et al. | |
| 5,987,062 A | 11/1999 | Engwer et al. | |
| 5,987,328 A | 11/1999 | Ephremides et al. | |
| 5,991,817 A | 11/1999 | Rowett et al. | |
| 5,999,813 A | 12/1999 | Lu et al. | |
| 6,005,853 A | 12/1999 | Wang et al. | |
| 6,011,784 A | 1/2000 | Brown et al. | |
| 6,012,088 A | 1/2000 | Li et al. | |
| 6,029,196 A | 2/2000 | Lenz | |
| 6,041,240 A | 3/2000 | McCarthy et al. | |
| 6,041,358 A | 3/2000 | Huang et al. | |
| 6,070,243 A | 5/2000 | See et al. | |
| 6,073,075 A | 6/2000 | Kondou et al. | |
| 6,073,152 A | 6/2000 | De Vries | |
| 6,078,568 A | 6/2000 | Wright et al. | |
| 6,088,591 A | 7/2000 | Trompower et al. | |
| 6,101,539 A | 8/2000 | Kennelly et al. | |
| 6,115,390 A | 9/2000 | Chuah | |
| 6,118,771 A | 9/2000 | Tajika et al. | |
| 6,119,009 A | 9/2000 | Baranger et al. | |
| 6,122,520 A | 9/2000 | Want et al. | |
| 6,144,638 A | 11/2000 | Obenhuber et al. | |
| 6,148,199 A | 11/2000 | Hoffman et al. | |
| 6,154,776 A | 11/2000 | Martin | |
| 6,160,804 A | 12/2000 | Ahmed et al. | |
| 6,177,905 B1 | 1/2001 | Welch | |
| 6,188,649 B1 | 2/2001 | Birukawa et al. | |
| 6,199,032 B1 | 3/2001 | Anderson | |
| 6,208,629 B1 | 3/2001 | Jaszewski et al. | |
| 6,208,841 B1 | 3/2001 | Wallace et al. | |
| 6,212,395 B1 | 4/2001 | Lu et al. | |
| 6,218,930 B1 | 4/2001 | Katzenberg et al. | |
| 6,240,078 B1 | 5/2001 | Kuhnel et al. | |
| 6,240,083 B1 | 5/2001 | Wright et al. | |
| 6,240,291 B1 | 5/2001 | Narasimhan et al. | |
| 6,246,751 B1 | 6/2001 | Bergl et al. | |
| 6,249,252 B1 | 6/2001 | Dupray | |
| 6,256,300 B1 | 7/2001 | Ahmed et al. | |
| 6,256,334 B1 | 7/2001 | Adachi | |
| 6,259,405 B1 | 7/2001 | Stewart et al. | |
| 6,262,988 B1 | 7/2001 | Vig | |
| 6,269,246 B1 | 7/2001 | Rao et al. | |
| 6,285,662 B1 | 9/2001 | Watanabe et al. | |
| 6,304,596 B1 | 10/2001 | Yamano et al. | |
| 6,304,906 B1 | 10/2001 | Bhatti et al. | |
| 6,317,599 B1 | 11/2001 | Rappaport et al. | |
| 6,326,918 B1 | 12/2001 | Stewart | |
| 6,336,035 B1 | 1/2002 | Somoza et al. | |
| 6,336,152 B1 | 1/2002 | Richman et al. | |
| 6,347,091 B1 | 2/2002 | Wallentin et al. | |
| 6,356,758 B1 | 3/2002 | Almeida et al. | |
| 6,393,290 B1 | 5/2002 | Ufongene | |
| 6,397,040 B1 | 5/2002 | Titmuss et al. | |
| 6,404,772 B1 | 6/2002 | Beach et al. | |
| 6,421,714 B1 | 7/2002 | Rai et al. | |
| 6,429,879 B1 | 8/2002 | Sturgeon et al. | |
| 6,446,206 B1 | 9/2002 | Feldbaum | |
| 6,456,239 B1 | 9/2002 | Werb et al. | |
| 6,470,025 B1 | 10/2002 | Wilson et al. | |
| 6,473,449 B1 | 10/2002 | Cafarella et al. | |
| 6,493,679 B1 | 12/2002 | Rappaport et al. | |
| 6,496,290 B1 | 12/2002 | Lee | |
| 6,512,916 B1 | 1/2003 | Forbes, Jr. | |
| 6,526,275 B1 | 2/2003 | Calvert | |
| 6,535,732 B1 | 3/2003 | McIntosh et al. | |
| 6,564,380 B1 | 5/2003 | Murphy | |
| 6,567,146 B2 | 5/2003 | Hirakata et al. | |
| 6,567,416 B1 | 5/2003 | Chuah | |

| | | |
|---|---|---|
| 6,574,240 B1 | 6/2003 | Tzeng |
| 6,580,700 B1 | 6/2003 | Pinard et al. |
| 6,587,680 B1 | 7/2003 | Ala-Laurila et al. |
| 6,587,835 B1 | 7/2003 | Treyz et al. |
| 6,603,970 B1 | 8/2003 | Huelamo Platas et al. |
| 6,614,787 B1 | 9/2003 | Jain et al. |
| 6,615,276 B1 | 9/2003 | Mastrianni et al. |
| 6,624,762 B1 | 9/2003 | End, III |
| 6,625,454 B1 | 9/2003 | Rappaport et al. |
| 6,631,267 B1 | 10/2003 | Clarkson et al. |
| 6,650,912 B2 | 11/2003 | Chen et al. |
| 6,658,389 B1 | 12/2003 | Alpdemir |
| 6,659,947 B1 | 12/2003 | Carter et al. |
| 6,661,787 B1 | 12/2003 | O'Connell et al. |
| 6,674,403 B2 | 1/2004 | Gray et al. |
| 6,677,894 B2 | 1/2004 | Sheynblat et al. |
| 6,678,516 B2 | 1/2004 | Nordman et al. |
| 6,678,802 B2 | 1/2004 | Hickson |
| 6,687,498 B2 | 2/2004 | McKenna et al. |
| 6,697,415 B1 | 2/2004 | Mahany |
| 6,721,334 B1 | 4/2004 | Ketcham |
| 6,725,260 B1 | 4/2004 | Philyaw |
| 6,738,629 B1 | 5/2004 | McCormick et al. |
| 6,747,961 B1 | 6/2004 | Ahmed et al. |
| 6,756,940 B2 | 6/2004 | Oh et al. |
| 6,760,324 B1 | 7/2004 | Scott et al. |
| 6,785,275 B1 | 8/2004 | Boivie et al. |
| 6,798,788 B1 | 9/2004 | Viswanath et al. |
| 6,801,782 B2 | 10/2004 | McCrady et al. |
| 6,826,399 B1 | 11/2004 | Hoffman et al. |
| 6,839,338 B1 | 1/2005 | Amara et al. |
| 6,839,348 B2 | 1/2005 | Tang et al. |
| 6,839,388 B2 | 1/2005 | Vaidyanathan |
| 6,847,620 B1 | 1/2005 | Meier |
| 6,847,892 B2 | 1/2005 | Zhou et al. |
| 6,856,800 B1 | 2/2005 | Henry et al. |
| 6,879,812 B2 | 4/2005 | Agrawal et al. |
| 6,901,439 B1 | 5/2005 | Bonasia et al. |
| 6,917,688 B2 | 7/2005 | Yu et al. |
| 6,934,260 B1 | 8/2005 | Kanuri |
| 6,937,566 B1 | 8/2005 | Forslow |
| 6,938,079 B1 | 8/2005 | Anderson et al. |
| 6,957,067 B1 | 10/2005 | Iyer et al. |
| 6,973,622 B1 | 12/2005 | Rappaport et al. |
| 6,978,301 B2 | 12/2005 | Tindal |
| 6,980,533 B1 | 12/2005 | Abraham et al. |
| 6,985,469 B2 | 1/2006 | Leung |
| 6,993,683 B2 | 1/2006 | Bhat et al. |
| 6,996,630 B1 | 2/2006 | Masaki et al. |
| 7,013,157 B1 | 3/2006 | Norman et al. |
| 7,020,438 B2 | 3/2006 | Sinivaara et al. |
| 7,020,773 B1 | 3/2006 | Otway et al. |
| 7,024,199 B1 | 4/2006 | Massie et al. |
| 7,024,394 B1 | 4/2006 | Ashour et al. |
| 7,027,773 B1 | 4/2006 | McMillin |
| 7,031,705 B2 | 4/2006 | Grootwassink |
| 7,035,220 B1 | 4/2006 | Simcoe |
| 7,039,037 B2 | 5/2006 | Wang et al. |
| 7,058,414 B1 | 6/2006 | Rofheart et al. |
| 7,062,566 B2 | 6/2006 | Amara et al. |
| 7,068,999 B2 | 6/2006 | Ballai |
| 7,079,537 B1 | 7/2006 | Kanuri et al. |
| 7,089,322 B1 | 8/2006 | Stallmann |
| 7,092,529 B2 | 8/2006 | Yu et al. |
| 7,110,756 B2 | 9/2006 | Diener |
| 7,116,979 B2 | 10/2006 | Backes et al. |
| 7,126,913 B1 | 10/2006 | Patel et al. |
| 7,134,012 B2 | 11/2006 | Doyle et al. |
| 7,139,829 B2 | 11/2006 | Wenzel et al. |
| 7,142,867 B1 | 11/2006 | Gandhi et al. |
| 7,146,166 B2 | 12/2006 | Backes et al. |
| 7,155,236 B2 | 12/2006 | Chen et al. |
| 7,155,518 B2 | 12/2006 | Forslow |
| 7,158,777 B2 | 1/2007 | Lee et al. |
| 7,159,016 B2 | 1/2007 | Baker |
| 7,221,927 B2 | 5/2007 | Kolar et al. |
| 7,224,970 B2 | 5/2007 | Smith et al. |
| 7,239,862 B1 | 7/2007 | Clare et al. |
| 7,246,243 B2 | 7/2007 | Uchida |
| 7,263,366 B2 | 8/2007 | Miyashita |
| 7,274,730 B2 | 9/2007 | Nakabayashi |
| 7,280,495 B1 | 10/2007 | Zweig et al. |
| 7,290,051 B2 | 10/2007 | Dobric et al. |
| 7,293,136 B1 | 11/2007 | More et al. |
| 7,310,664 B1 | 12/2007 | Merchant et al. |
| 7,317,914 B2 | 1/2008 | Adya et al. |
| 7,320,070 B2 | 1/2008 | Baum |
| 7,324,468 B2 | 1/2008 | Fischer |
| 7,324,487 B2 | 1/2008 | Saito |
| 7,324,489 B1 | 1/2008 | Iyer et al. |
| 7,349,412 B1 | 3/2008 | Jones et al. |
| 7,350,077 B2 | 3/2008 | Meier et al. |
| 7,359,676 B2 | 4/2008 | Hrastar |
| 7,370,362 B2 | 5/2008 | Olson et al. |
| 7,376,080 B1 | 5/2008 | Riddle et al. |
| 7,379,423 B1 | 5/2008 | Caves et al. |
| 7,382,756 B2 | 6/2008 | Barber et al. |
| 7,417,953 B2 | 8/2008 | Hicks et al. |
| 7,421,248 B1 | 9/2008 | Laux et al. |
| 7,421,487 B1 | 9/2008 | Peterson et al. |
| 7,440,416 B2 | 10/2008 | Mahany et al. |
| 7,443,823 B2 | 10/2008 | Hunkeler et al. |
| 7,447,502 B2 | 11/2008 | Buckley |
| 7,451,316 B2 | 11/2008 | Halasz et al. |
| 7,460,855 B2 | 12/2008 | Barkley et al. |
| 7,466,678 B2 | 12/2008 | Cromer et al. |
| 7,475,130 B2 | 1/2009 | Silverman |
| 7,477,894 B1 | 1/2009 | Sinha |
| 7,480,264 B1 | 1/2009 | Duo et al. |
| 7,483,390 B2 | 1/2009 | Rover et al. |
| 7,489,648 B2 | 2/2009 | Griswold |
| 7,493,407 B2 | 2/2009 | Leedom et al. |
| 7,505,434 B1 | 3/2009 | Backes |
| 7,509,096 B2 | 3/2009 | Palm et al. |
| 7,529,925 B2 | 5/2009 | Harkins |
| 7,551,574 B1 | 6/2009 | Peden, II et al. |
| 7,551,619 B2 | 6/2009 | Tiwari |
| 7,558,266 B2 | 7/2009 | Hu |
| 7,570,656 B2 | 8/2009 | Raphaeli et al. |
| 7,573,859 B2 | 8/2009 | Taylor |
| 7,577,453 B2 | 8/2009 | Matta |
| 7,592,906 B1 | 9/2009 | Hanna et al. |
| 7,603,119 B1 | 10/2009 | Durig et al. |
| 7,636,363 B2 | 12/2009 | Chang et al. |
| 7,680,501 B2 | 3/2010 | Sillasto et al. |
| 7,693,526 B2 | 4/2010 | Qian et al. |
| 7,715,432 B2 | 5/2010 | Bennett |
| 7,716,379 B2 | 5/2010 | Ruan et al. |
| 7,724,703 B2 | 5/2010 | Matta et al. |
| 7,724,704 B2 | 5/2010 | Simons et al. |
| 7,729,278 B2 | 6/2010 | Chari et al. |
| 7,733,868 B2 | 6/2010 | Van Zijst |
| 7,746,897 B2 | 6/2010 | Stephenson et al. |
| 7,788,475 B2 | 8/2010 | Zimmer et al. |
| 7,805,529 B2 | 9/2010 | Galluzzo et al. |
| 7,817,554 B2 | 10/2010 | Skog et al. |
| 7,844,298 B2 | 11/2010 | Riley |
| 7,865,713 B2 | 1/2011 | Chesnutt et al. |
| 7,873,061 B2 | 1/2011 | Gast et al. |
| 7,894,852 B2 | 2/2011 | Hansen |
| 7,912,982 B2 | 3/2011 | Murphy |
| 7,920,548 B2 | 4/2011 | Lor et al. |
| 7,929,922 B2 | 4/2011 | Kubo |
| 7,945,399 B2 | 5/2011 | Nosovitsky et al. |
| 7,986,940 B2 | 7/2011 | Lee et al. |
| 8,019,082 B1 | 9/2011 | Wiedmann et al. |
| 2001/0024953 A1 | 9/2001 | Balogh |
| 2002/0021701 A1 | 2/2002 | Lavian et al. |
| 2002/0052205 A1 | 5/2002 | Belostotsky et al. |
| 2002/0060995 A1 | 5/2002 | Cervello et al. |
| 2002/0062384 A1 | 5/2002 | Tso |
| 2002/0069278 A1 | 6/2002 | Forslow |
| 2002/0078361 A1 | 6/2002 | Giroux et al. |
| 2002/0080790 A1 | 6/2002 | Beshai |
| 2002/0087699 A1 | 7/2002 | Karagiannis et al. |
| 2002/0094824 A1 | 7/2002 | Kennedy et al. |
| 2002/0095486 A1 | 7/2002 | Bahl |
| 2002/0101868 A1 | 8/2002 | Clear et al. |

| | | |
|---|---|---|
| 2002/0116655 A1 | 8/2002 | Lew et al. |
| 2002/0157020 A1 | 10/2002 | Royer |
| 2002/0174137 A1 | 11/2002 | Wolff et al. |
| 2002/0176437 A1 | 11/2002 | Busch et al. |
| 2002/0188756 A1 | 12/2002 | Weil et al. |
| 2002/0191572 A1 | 12/2002 | Weinstein et al. |
| 2002/0194251 A1 | 12/2002 | Richter et al. |
| 2003/0014646 A1 | 1/2003 | Buddhikot et al. |
| 2003/0018889 A1 | 1/2003 | Burnett et al. |
| 2003/0043073 A1 | 3/2003 | Gray et al. |
| 2003/0055959 A1 | 3/2003 | Sato |
| 2003/0107590 A1 | 6/2003 | Levillain et al. |
| 2003/0120764 A1 | 6/2003 | Laye et al. |
| 2003/0133450 A1 | 7/2003 | Baum |
| 2003/0134642 A1 | 7/2003 | Kostic et al. |
| 2003/0135762 A1 | 7/2003 | Macaulay |
| 2003/0156586 A1 | 8/2003 | Lee et al. |
| 2003/0174706 A1 | 9/2003 | Shankar et al. |
| 2003/0193910 A1 | 10/2003 | Shoaib et al. |
| 2003/0204596 A1 | 10/2003 | Yadav |
| 2003/0227934 A1 | 12/2003 | White et al. |
| 2004/0002343 A1 | 1/2004 | Brauel et al. |
| 2004/0003285 A1 | 1/2004 | Whelan et al. |
| 2004/0019857 A1 | 1/2004 | Teig et al. |
| 2004/0025044 A1 | 2/2004 | Day |
| 2004/0029580 A1 | 2/2004 | Haverinen et al. |
| 2004/0030777 A1 | 2/2004 | Reedy et al. |
| 2004/0038687 A1 | 2/2004 | Nelson |
| 2004/0044749 A1 | 3/2004 | Harkin |
| 2004/0047320 A1 | 3/2004 | Eglin |
| 2004/0053632 A1 | 3/2004 | Nikkelen et al. |
| 2004/0054569 A1 | 3/2004 | Pombo et al. |
| 2004/0054774 A1 | 3/2004 | Barber et al. |
| 2004/0054926 A1 | 3/2004 | Ocepek et al. |
| 2004/0062267 A1 | 4/2004 | Minami et al. |
| 2004/0064560 A1 | 4/2004 | Zhang et al. |
| 2004/0068668 A1 | 4/2004 | Lor et al. |
| 2004/0078598 A1 | 4/2004 | Barber et al. |
| 2004/0093506 A1 | 5/2004 | Grawrock et al. |
| 2004/0095914 A1 | 5/2004 | Katsube et al. |
| 2004/0095932 A1 | 5/2004 | Astarabadi et al. |
| 2004/0106403 A1 | 6/2004 | Mori et al. |
| 2004/0111640 A1 | 6/2004 | Baum |
| 2004/0114546 A1 | 6/2004 | Seshadri et al. |
| 2004/0119641 A1 | 6/2004 | Rapeli |
| 2004/0120370 A1 | 6/2004 | Lupo |
| 2004/0143428 A1 | 7/2004 | Rappaport et al. |
| 2004/0143755 A1 | 7/2004 | Whitaker et al. |
| 2004/0165545 A1 | 8/2004 | Cook |
| 2004/0174900 A1 | 9/2004 | Volpi et al. |
| 2004/0184475 A1 | 9/2004 | Meier |
| 2004/0208570 A1 | 10/2004 | Reader |
| 2004/0214572 A1 | 10/2004 | Thompson et al. |
| 2004/0221042 A1 | 11/2004 | Meier |
| 2004/0230370 A1 | 11/2004 | Tzamaloukas |
| 2004/0233234 A1 | 11/2004 | Chaudhry et al. |
| 2004/0236702 A1 | 11/2004 | Fink et al. |
| 2004/0246937 A1 | 12/2004 | Duong et al. |
| 2004/0246962 A1 | 12/2004 | Kopeikin et al. |
| 2004/0252656 A1 | 12/2004 | Shiu et al. |
| 2004/0255167 A1 | 12/2004 | Knight |
| 2004/0259542 A1 | 12/2004 | Viitamaki et al. |
| 2004/0259555 A1 | 12/2004 | Rappaport et al. |
| 2004/0259575 A1 | 12/2004 | Perez-Breva et al. |
| 2005/0015592 A1 | 1/2005 | Lin |
| 2005/0021979 A1 | 1/2005 | Wiedmann et al. |
| 2005/0025105 A1 | 2/2005 | Rue |
| 2005/0026611 A1 | 2/2005 | Backes |
| 2005/0030894 A1 | 2/2005 | Stephens |
| 2005/0030929 A1 | 2/2005 | Swier et al. |
| 2005/0037818 A1 | 2/2005 | Seshadri et al. |
| 2005/0040968 A1 | 2/2005 | Damarla et al. |
| 2005/0054326 A1 | 3/2005 | Rogers |
| 2005/0054350 A1 | 3/2005 | Zegelin |
| 2005/0058132 A1 | 3/2005 | Okano et al. |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0078644 A1 | 4/2005 | Tsai et al. |
| 2005/0097618 A1 | 5/2005 | Arling et al. |
| 2005/0114649 A1 | 5/2005 | Challener et al. |
| 2005/0120125 A1 | 6/2005 | Morten et al. |
| 2005/0122927 A1 | 6/2005 | Wentink |
| 2005/0122977 A1 | 6/2005 | Lieberman |
| 2005/0128142 A1 | 6/2005 | Shin et al. |
| 2005/0128989 A1 | 6/2005 | Bhagwat et al. |
| 2005/0144237 A1 | 6/2005 | Heredia et al. |
| 2005/0147032 A1 | 7/2005 | Lyon et al. |
| 2005/0154933 A1 | 7/2005 | Hsu et al. |
| 2005/0157730 A1 | 7/2005 | Grant et al. |
| 2005/0159154 A1 | 7/2005 | Goren |
| 2005/0163078 A1 | 7/2005 | Oba et al. |
| 2005/0163146 A1 | 7/2005 | Ota et al. |
| 2005/0175027 A1 | 8/2005 | Miller et al. |
| 2005/0180345 A1 | 8/2005 | Meier |
| 2005/0180358 A1 | 8/2005 | Kolar et al. |
| 2005/0181805 A1 | 8/2005 | Gallagher |
| 2005/0190714 A1 | 9/2005 | Gorbatov et al. |
| 2005/0193103 A1 | 9/2005 | Drabik |
| 2005/0207336 A1 | 9/2005 | Choi et al. |
| 2005/0213519 A1 | 9/2005 | Relan et al. |
| 2005/0220033 A1 | 10/2005 | DelRegno et al. |
| 2005/0223111 A1 | 10/2005 | Bhandaru et al. |
| 2005/0239461 A1 | 10/2005 | Verma et al. |
| 2005/0240665 A1 | 10/2005 | Gu et al. |
| 2005/0243737 A1 | 11/2005 | Dooley et al. |
| 2005/0245258 A1* | 11/2005 | Classon et al. ............... 455/434 |
| 2005/0245269 A1 | 11/2005 | Demirhan et al. |
| 2005/0259597 A1 | 11/2005 | Benedetto et al. |
| 2005/0259611 A1 | 11/2005 | Bhagwat et al. |
| 2005/0270992 A1 | 12/2005 | Sanzgiri et al. |
| 2005/0273442 A1 | 12/2005 | Bennett et al. |
| 2005/0276218 A1 | 12/2005 | Ooghe et al. |
| 2005/0286466 A1 | 12/2005 | Tagg et al. |
| 2006/0030290 A1 | 2/2006 | Rudolf et al. |
| 2006/0035662 A1 | 2/2006 | Jeong et al. |
| 2006/0039395 A1 | 2/2006 | Perez-Costa et al. |
| 2006/0041683 A1 | 2/2006 | Subramanian et al. |
| 2006/0045050 A1 | 3/2006 | Floros et al. |
| 2006/0046744 A1 | 3/2006 | Dublish et al. |
| 2006/0050742 A1 | 3/2006 | Grandhi et al. |
| 2006/0073847 A1 | 4/2006 | Pirzada et al. |
| 2006/0094440 A1 | 5/2006 | Meier et al. |
| 2006/0098607 A1 | 5/2006 | Zeng et al. |
| 2006/0104224 A1 | 5/2006 | Singh et al. |
| 2006/0114872 A1 | 6/2006 | Hamada |
| 2006/0117174 A1 | 6/2006 | Lee |
| 2006/0128415 A1 | 6/2006 | Horikoshi et al. |
| 2006/0143496 A1 | 6/2006 | Silverman |
| 2006/0152344 A1 | 7/2006 | Mowery |
| 2006/0160540 A1 | 7/2006 | Strutt et al. |
| 2006/0161983 A1 | 7/2006 | Cothrell et al. |
| 2006/0165103 A1 | 7/2006 | Trudeau et al. |
| 2006/0168383 A1 | 7/2006 | Lin |
| 2006/0173844 A1 | 8/2006 | Zhang et al. |
| 2006/0174336 A1 | 8/2006 | Chen |
| 2006/0178168 A1 | 8/2006 | Roach |
| 2006/0182118 A1 | 8/2006 | Lam et al. |
| 2006/0189311 A1 | 8/2006 | Cromer et al. |
| 2006/0190721 A1 | 8/2006 | Kawakami et al. |
| 2006/0193258 A1 | 8/2006 | Ballai |
| 2006/0200862 A1 | 9/2006 | Olson et al. |
| 2006/0206582 A1 | 9/2006 | Finn |
| 2006/0215601 A1 | 9/2006 | Vieugels et al. |
| 2006/0217131 A1 | 9/2006 | Alizadeh-Shabdiz et al. |
| 2006/0245393 A1 | 11/2006 | Bajic |
| 2006/0248229 A1 | 11/2006 | Saunderson et al. |
| 2006/0248331 A1 | 11/2006 | Harkins |
| 2006/0268696 A1 | 11/2006 | Konstantinov et al. |
| 2006/0274774 A1 | 12/2006 | Srinivasan et al. |
| 2006/0276192 A1 | 12/2006 | Dutta et al. |
| 2006/0285489 A1 | 12/2006 | Francisco et al. |
| 2006/0292992 A1 | 12/2006 | Tajima et al. |
| 2007/0002833 A1 | 1/2007 | Bajic |
| 2007/0008884 A1 | 1/2007 | Tang |
| 2007/0010248 A1 | 1/2007 | Dravida et al. |

| | | |
|---|---|---|
| 2007/0011318 A1 | 1/2007 | Roth |
| 2007/0025265 A1 | 2/2007 | Porras et al. |
| 2007/0025306 A1 | 2/2007 | Cox et al. |
| 2007/0027964 A1 | 2/2007 | Herrod et al. |
| 2007/0054616 A1 | 3/2007 | Culbert |
| 2007/0058598 A1 | 3/2007 | Ling |
| 2007/0064673 A1 | 3/2007 | Bhandaru et al. |
| 2007/0064718 A1 | 3/2007 | Ekl et al. |
| 2007/0067823 A1 | 3/2007 | Shim et al. |
| 2007/0070937 A1 | 3/2007 | Demirhan et al. |
| 2007/0076694 A1 | 4/2007 | Iyer et al. |
| 2007/0081477 A1 | 4/2007 | Jakkahalli et al. |
| 2007/0082677 A1 | 4/2007 | Hart et al. |
| 2007/0083924 A1 | 4/2007 | Lu |
| 2007/0086378 A1 | 4/2007 | Matta et al. |
| 2007/0086397 A1 | 4/2007 | Taylor |
| 2007/0086398 A1 | 4/2007 | Tiwari |
| 2007/0091845 A1 | 4/2007 | Brideglall |
| 2007/0091889 A1 | 4/2007 | Xiao et al. |
| 2007/0098086 A1 | 5/2007 | Bhaskaran |
| 2007/0104197 A1 | 5/2007 | King |
| 2007/0106776 A1 | 5/2007 | Konno et al. |
| 2007/0115842 A1 | 5/2007 | Matsuda et al. |
| 2007/0133494 A1 | 6/2007 | Lai et al. |
| 2007/0135159 A1 | 6/2007 | Sinivaara |
| 2007/0135866 A1 | 6/2007 | Baker et al. |
| 2007/0136372 A1 | 6/2007 | Proctor et al. |
| 2007/0150945 A1 | 6/2007 | Whitaker et al. |
| 2007/0160046 A1 | 7/2007 | Matta |
| 2007/0171909 A1 | 7/2007 | Pignatelli |
| 2007/0183375 A1 | 8/2007 | Tiwari |
| 2007/0189222 A1 | 8/2007 | Kolar et al. |
| 2007/0195793 A1 | 8/2007 | Grosser et al. |
| 2007/0230457 A1 | 10/2007 | Kodera et al. |
| 2007/0248009 A1 | 10/2007 | Petersen |
| 2007/0253380 A1 | 11/2007 | Jollota et al. |
| 2007/0255116 A1 | 11/2007 | Mehta et al. |
| 2007/0258448 A1 | 11/2007 | Hu |
| 2007/0260720 A1 | 11/2007 | Morain |
| 2007/0268506 A1 | 11/2007 | Zeldin |
| 2007/0268514 A1 | 11/2007 | Zeldin et al. |
| 2007/0268515 A1 | 11/2007 | Freund et al. |
| 2007/0268516 A1 | 11/2007 | Bugwadia et al. |
| 2007/0286208 A1 | 12/2007 | Kanada et al. |
| 2007/0287390 A1 | 12/2007 | Murphy et al. |
| 2007/0291689 A1 | 12/2007 | Kapur et al. |
| 2007/0297329 A1 | 12/2007 | Park et al. |
| 2008/0002588 A1 | 1/2008 | McCaughan et al. |
| 2008/0008117 A1 | 1/2008 | Alizadeh-Shabdiz |
| 2008/0013481 A1 | 1/2008 | Simons et al. |
| 2008/0014916 A1 | 1/2008 | Chen |
| 2008/0031257 A1 | 2/2008 | He |
| 2008/0056200 A1 | 3/2008 | Johnson |
| 2008/0056211 A1 | 3/2008 | Kim et al. |
| 2008/0064356 A1* | 3/2008 | Khayrallah ............... 455/277.1 |
| 2008/0069018 A1 | 3/2008 | Gast |
| 2008/0080441 A1 | 4/2008 | Park et al. |
| 2008/0102815 A1 | 5/2008 | Sengupta et al. |
| 2008/0107077 A1 | 5/2008 | Murphy |
| 2008/0114784 A1 | 5/2008 | Murphy |
| 2008/0117822 A1 | 5/2008 | Murphy et al. |
| 2008/0130523 A1 | 6/2008 | Fridman et al. |
| 2008/0151844 A1 | 6/2008 | Tiwari |
| 2008/0159319 A1 | 7/2008 | Gast et al. |
| 2008/0162921 A1 | 7/2008 | Chesnutt et al. |
| 2008/0220772 A1 | 9/2008 | Islam et al. |
| 2008/0226075 A1 | 9/2008 | Gast |
| 2008/0228942 A1 | 9/2008 | Lor et al. |
| 2008/0250496 A1 | 10/2008 | Namihira |
| 2008/0261615 A1 | 10/2008 | Kalhan |
| 2008/0276303 A1 | 11/2008 | Gast |
| 2009/0031044 A1 | 1/2009 | Barrack et al. |
| 2009/0046688 A1 | 2/2009 | Volpi et al. |
| 2009/0059930 A1 | 3/2009 | Ryan et al. |
| 2009/0067436 A1 | 3/2009 | Gast et al. |
| 2009/0073905 A1 | 3/2009 | Gast |
| 2009/0131082 A1 | 5/2009 | Gast |
| 2009/0198999 A1 | 8/2009 | Harkins |
| 2009/0247103 A1 | 10/2009 | Aragon |
| 2009/0257437 A1 | 10/2009 | Tiwari |
| 2009/0260083 A1 | 10/2009 | Szeto et al. |
| 2009/0274060 A1 | 11/2009 | Taylor |
| 2009/0287816 A1 | 11/2009 | Matta et al. |
| 2009/0293106 A1 | 11/2009 | Gray et al. |
| 2010/0002610 A1 | 1/2010 | Bowser et al. |
| 2010/0024007 A1 | 1/2010 | Gast |
| 2010/0040059 A1 | 2/2010 | Hu |
| 2010/0172276 A1 | 7/2010 | Aragon |
| 2010/0180016 A1 | 7/2010 | Bugwadia et al. |
| 2010/0195549 A1 | 8/2010 | Aragon et al. |
| 2010/0261475 A1 | 10/2010 | Kim et al. |
| 2010/0329177 A1 | 12/2010 | Murphy et al. |
| 2011/0128858 A1 | 6/2011 | Matta et al. |
| 2011/0158122 A1 | 6/2011 | Murphy et al. |

FOREIGN PATENT DOCUMENTS

| | | |
|---|---|---|
| EP | 1 542 409 A | 6/2005 |
| EP | 1542 409 A1 | 6/2005 |
| GB | 2 329 801 A | 3/1999 |
| GB | 2429080 A | 2/2007 |
| JP | 2000-215169 A1 | 8/2000 |
| JP | 2003-234751 A1 | 8/2003 |
| JP | 2003274454 | 9/2003 |
| JP | 2004-032525 A1 | 1/2004 |
| WO | WO-9403986 | 2/1994 |
| WO | WO-9911003 | 3/1999 |
| WO | WO 00/06271 A1 | 2/2000 |
| WO | WO 00/18148 | 3/2000 |
| WO | WO 02/089442 A1 | 11/2002 |
| WO | WO-03085544 A1 | 10/2003 |
| WO | WO 2004/013986 A1 | 2/2004 |
| WO | WO-2004095192 A2 | 11/2004 |
| WO | WO-2004095800 A1 | 11/2004 |
| WO | WO 2006/014512 A2 | 2/2006 |

OTHER PUBLICATIONS

Co-pending U.S. Appl. No. 11/845,029, filed Aug. 24, 2007.
Co-pending U.S. Appl. No. 11/852,234, filed Sep. 7, 2007.
Co-pending U.S. Appl. No. 11/970,484, filed Jan. 7, 2008.
Co-pending U.S. Appl. No. 12/077,051, filed Mar. 14, 2008.
Co-pending U.S. Appl. No. 12/113,535, filed May 1, 2008.
Co-pending U.S. Appl. No. 12/172,195, filed Jul. 11. 2008.
Final Office Action Mailed Jan. 25, 2010, in Co-pending U.S. Appl. No.1 11/845,029, filed Aug. 24, 2007.
Non-Final Office Action Mailed Jul. 9, 2009, in Co-pending U.S. Appl. No. 11/845,029, filed Aug. 24, 2007.
Non-Final Office Action Mailed Nov. 19, 2009, in Co-pending U.S. Appl. No. 11/648,359, filed Dec. 28, 2006.
Non-Final Office Action Mailed Jan. 21, 2010, in Co-pending U.S. Appl. No. 11/852,234, filed Sep. 7, 2007.
Non-Final Office Action Mailed Jun. 29, 2009, in Co-pendning U.S. Appl. No. 11/852,234, filed Sep. 7, 2007.
Written Opinion PCT/US07/19696 dated Feb. 29, 2008, pp. 1-5.
Written Opinion PCT/US08/010708 dated May 18, 2009, pp. 1-12.
Acampora and Winters, IEEE Communications Magazine, 25(8):11-20 (1987).
Acampora and Winters, IEEE Journal on selected Areas in Communications. SAC-5:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Fortune et al., IEEE Computational Science and Engineering, "Wise Design of Indoor Wireless Systems: Practical Computation and Optimization", p. 58-68 (1995).
Freret et al., Applications of Spread-Spectrum Radio to Wireless Terminal Communications, Conf. Record, Nat'l Telecom. Conf., Nov. 30-Dec. 4, 1980.
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.

Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.

Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).

LAN/MAN Standars Committee of the IEEE Computer Society, Part 11: Wireless LAN Medium Access Control (MAC) and Physical Layer (PHY) Specifications:Higher Speed Physical Layer Extension in the 2.4 GHz Band, IEEE Std. 802.11b (1999).

Law, A., "New Service Discovery Protocol," Internet Citation [Online] XP002292473 Retrieved from the Internet: URL:/http://sern.uccalgary.ca/{lawa/SENG60921/arch/SDP.htm> [retrieved Aug. 12, 2004] the whole document.

Okamoto and Xu, IEEE, Proceeding so of the 13th Annual Hawaii International Conference on System Sciences, pp. 54-63 (1997).

Panjwani et al., "Interactive Computation of Coverage Regions for Wireless Communication in Multifloored Indoor Environments", IEEE Journal on Selected Areas in Communications, vol. 14, No. 3, Apr. 1996.

Perram and Martinez, "Technology Developments for Low-Cost Residential Alarm Systems", Proceedings 1977 Carnahan Conference on Crime Countermeasures, Apr. 6-8, pp. 45-50 (1977).

Piazzi et al., "Achievable Accuracy of Site-Specific Path-Loss Predictions in Residential Environments", IEEE Transactions on Vehicular Technology, vol. 48, No. 3, May 1999.

Puttini, R., Percher, J., Me, L., and de Sousa, R. 2004. A fully distributed IDS for MAN ET. In Proceedings of the Ninth international Symposium on Computers and Communications 2004 vol. 2 (Iscc"04)—vol. 02 (Jun. 28-Jul. 1, 2004). ISCC. IEEE Computer Society, Washington, DC, 331-338.

Seidel et al., "Site-Specific Propagation Prediction for Wireless In-Building Personal Communications System Design", IEEE Transactions on Vehicular Technology, vol. 43, No. 4, Nov. 1994.

Skidmore et al., "Interactive Coverage Region and System Design Simulation for Wireless Communication Systems in Multi-floored Indoor Environments, SMT Plus" IEEE ICUPC '96 Proceedings (1996).

Ullmo et al., "Wireless Propagation in Buildings: A Statistic Scattering Approach", IEEE Transactions on Vehicular Technology, vol. 48, No. 3, May 1999.

International Search Report PCT/US2007/19696 dated Feb. 29, 2008; p. 1.

International Search Report PCT/US2008/010708 dated May 18, 2009; p. 1-2.

Non-Final Office Action Mailed Jun. 1, 2010, in Co-pending U.S. Appl. No. 12/172,195, filed Jul. 11, 2008.

Notice of Allowance mailed Jun. 23, 2010, in Co-pending U.S. Appl. No. 11/648,359, filed Dec. 28, 2006.

Non-Final Office Action Mailed May 14, 2010, in Co-pending U.S. Appl. No. 11/845,029, filed Aug. 24, 2007.

P. Martinez, M. Brunner, J. Quittek, F. Straus, J. Schonwider, S. Martens, T. Klie "Using the Script MIB for Policy-based Configuration Management", Technical University Braunschweig, Braunschweig, Germany, 2002.

Law, A., "New Service Discovery Protocol," Internet Citation [Online] XP002292473 Retrieved from the Internet: <URL: http://sern.uccalgary.ca~lawa/SENG60921/arch/SDP.htm> [retrieved Aug. 12, 2004] (15 pages).

P. Bahl et al., RADAR: An In-Building RF-based User Location and Tracking System, Microsoft Research, Mar. 2000, 10 pages.

Latvala J. et al., Evaluation of RSSI-Based Human Tracking, Proceedings for the 2000 European Signal Processing Conference, Sep. 2000, 9 pages.

Bahl P. et al. "User Location and Tracking in an In-Building Radio Network," Microsoft Research, Feb. 1999, 13 pages.

P. Bahl et al., A Software System for Locating Mobile Users: Design, Evaluation, and Lessons, Microsoft Research, Feb. 1999, 13 pages.

Chen, Yen-Chen et al., "Enabling Location-Based Services on Wireless LANs", Networks, 2003. ICON2003. The 11th IEEE International Conference, Sep. 28-Oct. 1, 2003, pp. 567-572.

Erten, Y. Murat, "A Layered Security Architecture for Corporate 802.11 Wireless Networks", Wireless Telecommunications Symposium, May 14-15, 2004, pp. 123-128.

Kleien-Ostmann, T., et al., "A Data Fusion Architecture for Enhanced Position Estimation in Wireless Networks," IEEE Communications Letters, vol. 5(8), Aug. 2001, p. 343-345.

Pulson, Time Domain Corporation, Ultra wideband (UWB) Radios for Precision Location, Third IEEE Workshop on Wireless Local Area Networks, Sep. 27-28, 2001, 8 pages.

Barber, S., Monitoring 802.1 Networks, IEEE 802.11, Sydney, NSW, May 13-17, 2002.

Latvala, J. et al. "Patient Tracking in a Hospital Environment Using Extended Kalman-filtering," Proceedings of the 1999 Middle East Conference on Networking, Nov. 1999, 5 pages.

Myllymaki, P. et al., "A Probabilistic Approach to WLAN User Location Estimation," Third IEEE Workshop on Wireless Local Area Networks, Sep. 27-28, 2001, 12 pages.

Potter, B., and Fleck, B., 802.11 Security, O'Reilly Media Inc., Dec. 2002, 14 pages.

McCann, S., et al., "Emergency Services for 802," IEEE 802.11-07/0505r1, Mar. 2007, 27 pages.

Di Sorte, D., et al., "On the Performance of Service Publishing in IEEE 802.11 Multi-Access Environment," IEEE Communications Letters, vol. 11, No. 4, Apr. 2007, 3 pages.

Microsoft Computer Dictionary, Fifth Edition, Microsoft Corporation, 2002, 2 pages.

Thomas, Allan, Cisco Systems, AP Power Down Notification, Power Point slide show; IEEE standards committee meeting Jul. 15, 2008; doc.: IEEE 802.11-08/0759r0, 14 pages.

3COM, Wireless LAN Mobility System: Wireless LAN Switch and Controller Configuration Guide, 3COM, Revision A, Oct. 2004, 476 pages.

3COM, Wireless LAN Switch Manager (3WXM), 3COM, Revision C, Oct. 2004, 8 pages.

3COM, Wireless LAN Switch and Controller; Quick Start Guide, 3COM, Revision B, Nov. 2004, 10 pages.

3COM, Wireless LAN Mobility System; Wireless LAN Switch and Controller Installation and Basic Configuration Guide, Revision B, Apr. 2005, 496 pages.

Johnson, David B, et al., "DSR The Dynamic Source Routing Protocol for Multi-Hop Wireless Ad Hoc Networks," Computer Science Department, Carnegie Mellon University, Nov. 3, 2005 (http://monarch.cs.rice.edu/monarch-papers/dsr-chapter00.pdf).

Information Sciences Institute, RFC-791—Internet Protocol, DARPA, Sep. 1981.

U.S. Appl. No. 12/603,391, filed Oct. 21, 2009.
U.S. Appl. No. 12/763,057, filed Apr. 19, 2010.
U.S. Appl. No. 13/006,950, filed Jan. 14, 2011.
U.S. Appl. No. 09/866,474, filed May 29, 2001.
U.S. Appl. No. 13/017,801, filed Jan. 31, 2011.
Office Action for U.S. Appl. No. 11/784,307, mailed Sep. 22, 2009.
Final Office Action for U.S. Appl. No. 11/784,307, mailed Jun. 14 2010.
Non-Final Office Action for U.S. Appl. No. 11/377,859 mailed Jan. 8, 2008.
Final Office Action for U.S. Appl. No. 11/377,859, mailed Aug. 27 2008.
Office Action for U.S. Appl. No. 12/401,073, mailed Aug. 23, 2010.
Final Office Action for U.S. Appl. No. 12/401,073, mailed Apr. 1, 2011.
Office Action for U.S. Appl. No. 12/401,073, mailed Sep. 20, 2011.
Office Action for U.S. Appl. No. 11/326,966, mailed Nov. 14, 2008.
Office Action for U.S. Appl. No. 12/500,392, mailed Jun. 20, 2011.
Office Action for U.S. Appl. No. 11/400,165, mailed Aug. 19, 2008.
Office Action for U.S. Appl. No. 12/489,295, mailed Apr. 27, 2011.
Office Action for U.S. Appl. No. 11/330,877, mailed Sep. 11, 2008.
Final Office Action for U.S. Appl. No. 11/330,877, mailed Mar. 13, 2009.
Office Action for U.S. Appl. No. 11/330,877, mailed Aug. 6, 2009.

Final Office Action for U.S. Appl. No. 11/330,877, mailed Apr. 22 2010.
Office Action for U.S. Appl. No. 11/330,877, mailed Jan. 13, 2011.
Final Office Action for U.S. Appl. No. 11/330,877, mailed May 27, 2011.
Office Action for U.S. Appl. No. 11/351,104, mailed Oct. 28, 2008.
Office Action for U.S. Appl. No. 11/351,104, mailed Dec. 2, 2009.
Final Office Action for U.S. Appl. No. 11/351,104, mailed Jun. 10, 2009.
Office Action for U.S. Appl. No. 11/351,104, mailed May 26, 2010.
Office Action for U.S. Appl. No. 11/351,104, mailed Nov. 29, 2010.
Office Action for U.S. Appl. No. 11/351,104, mailed Jul. 26, 2011.
Office Action for U.S. Appl. No. 11/437,537, mailed Dec. 23, 2008.
Final Office Action for U.S. Appl. No. 11/437,537, mailed Jul. 16, 2009.
Office Action for U.S. Appl. No. 11/331,789, mailed Jun. 13, 2008.
Final Office Action for U.S. Appl. No. 11/331,789, mailed Oct. 23, 2008.
Office Action for U.S. Appl. No. 11/331,789, mailed Aug. 5, 2009.
Office Action for U.S. Appl. No. 12/785,362, mailed Apr. 22, 2011.
Office Action for U.S. Appl. No. 11/417,830, mailed Nov. 14, 2008.
Final Office Action for U.S. Appl. No. 11/417,830, mailed May 28, 2009.
Office Action for U.S. Appl. No. 11/417,993, mailed Oct. 29, 2008.
Office Action for U.S. Appl. No. 12/370,562, mailed Sep. 30, 2010.
Office Action for U.S. Appl. No. 12/370,562, mailed Apr. 6, 2011.
Office Action for U.S. Appl. No. 11/592,891, mailed Jan. 15, 2009.
Final Office Action for U.S. Appl. No. 11/592,891, mailed Jul. 20, 2009.
Office Action for U.S. Appl. No. 11/595,119, mailed Jul. 21, 2009.
Final Office Action for U.S. Appl. No. 11/595,119, mailed Jan. 5, 2010.
Office Action for U.S. Appl. No. 11/595,119, mailed Aug. 19, 2010.
Final Office Action for U.S. Appl. No. 11/595,119, mailed Aug. 2, 2011.
Office Action for U.S. Appl. No. 11/604,075, mailed May 3, 2010.
Final Office Action for U.S. Appl. No. 11/845,029, mailed Dec. 9, 2010.
Office Action for U.S. Appl. No. 11/845,029, mailed Sep. 27, 2011.
Office Action for U.S. Appl. No. 11/437,538, mailed Dec. 22, 2008.
Final Office Action for U.S. Appl. No. 11/437,538 mailed Jun. 10, 2009.
Office Action for U.S. Appl. No. 11/437,387, mailed Dec. 23, 2008.
Final Office Action for U.S. Appl. No. 11/437,387, mailed Jul. 15, 2009.
Office Action for U.S. Appl. No. 11/437,582, mailed Jan. 8, 2009.
Final Office Action for U.S. Appl. No. 11/437,582, mailed Jul. 22, 2009.
Office Action for U.S. Appl. No. 11/801964, mailed Sep. 17, 2010.
Final Office Action for U.S. Appl. No. 11/801,964, mailed May 11, 2011.
Office Action for U.S. Appl. No. 12/304,100, mailed Jun. 17, 2011.
Office Action for U.S. Appl. No. 11/487,722, mailed Aug. 7, 2009.
Office Action for U.S. Appl. No. 11/643,329, mailed Jul. 9, 2010.
Office Action for U.S. Appl. No. 11/944,346, mailed Nov. 23, 2010.
Office Action for U.S. Appl. No. 12/077,051, mailed Dec. 28, 2010.
Office Action for U.S. Appl. No. 12/113,535, mailed Apr. 21, 2011.
Office Action for U.S. Appl. No. 11/852,234, mailed Aug. 9, 2010.
Office Action for U.S. Appl. No. 11/852,234, mailed Apr. 27, 2011.
Office Action for U.S. Appl. No. 11/970,484, mailed Nov. 24, 2010.
Final Office Action for U.S. Appl. No. 11/970,484, mailed Jul. 22, 2011.
Office Action for U.S. Appl. No. 12/172,195, mailed Nov. 12, 2010.
Office Action for U.S. Appl. No. 12/336,492, mailed Sep. 15, 2011.
Office Action for U.S. Appl. No. 12/350,927, mailed Aug. 17, 2011.
Office Action for U.S. Appl. No. 12/365,891, mailed Aug. 29, 2011.
Office Action for U.S. Appl. No. 10/235,338, mailed Jan. 8, 2003.
Office Action for U.S. Appl. No. 11/094,987, mailed Dec. 27, 2007.
Final Office Action for U.S. Appl. No. 11/094,987, mailed May 23, 2008.
Office Action for U.S. Appl. No. 11/094,987, mailed Oct. 21, 2008.
Office Action for U.S. Appl. No. 12/474,020, mailed Jun. 3, 2010.
Final Office Action for U.S. Appl. No. 12/474,020, mailed Oct. 4, 2010.
Office Action for U.S. Appl. No. 09/866,474, mailed Nov. 30, 2004.
Final Office Action for U.S. Appl. No. 09/866,474, mailed Jun. 10, 2005.
Office Action for U.S. Appl. No. 10/667,027, mailed Jul. 29, 2005.
Final Office Action for U.S. Appl. No. 10/667,027, mailed Mar. 10, 2006.
Office Action for U.S. Appl. No. 10/667,027, mailed May 5, 2006.
Final Office Action for U.S. Appl. No. 10/667,027, mailed Feb. 26, 2007.
Office Action for U.S. Appl. No. 10/666,848, mailed Mar. 22, 2007.
Office Action for U.S. Appl. No. 10/667,136, mailed Jan. 25, 2006.
Office Action for U.S. Appl. No. 10/667,136, mailed Aug. 28, 2006.
Final Office Action for U.S. Appl. No. 10/667,136, mailed Mar. 9, 2007.
International Search Report and Written Opinion for PCT/US05/004702, mailed Aug. 10, 2006.
International Search Report and Written Opinion for PCT/US2006/009525, mailed Sep. 13, 2007.
International Search Report and Written Opinion for PCT/US06/40500, mailed Aug. 17, 2007.
International Search Report and Written Opinion for PCT/US06/40498, mailed Dec. 28, 2007.
International Search Report and Written Opinion for PCT/US2007/012194 dated Feb. 4, 2008.
International Search Report and Written Opinion for PCT/US06/40499, mailed Dec. 13, 2007.
International Search Report and Written Opinion for PCT/US2007/12016, mailed Jan. 4, 2008.
International Search Report and Written Opinion for PCT/US2007/012195, mailed Mar. 19, 2008.
International Search Report and Written Opnion for PCT/US07/013758 mailed Apr. 3, 2008.
First Office Action for Chinese Application No. 2007800229623.X , mailed Dec. 31, 2010.
International Search Report and Written Opinion for PCT/US07/013757, mailed Jan. 22, 2008.
International Search Report and Written Opnion for PCT/US07/14847, mailed Apr. 1, 2008.
International Search Report and Written Opnion for PCT/US07/089134, mailed Apr. 10, 2008.
Supplementary Partial European Search Report for European Application No. 02770460, mailed Aug. 20, 2004.
Supplementary Partial European Search Report for European Application No. 02770460, mailed Dec. 15, 2004.
Examination Report for European Application No. 02770460, Mar. 18, 2005.
Summons for Oral Hearing Proceedinsg for European Application No. 02770460, Jan. 31, 2006.
International Search Report for PCT/US02/28090, mailed Aug. 13, 2003.
International Preliminary Examination Report for PCT/US02/28090, mailed Oct. 29, 2003.
Examination Report for European Application No. 06006504, mailed Oct. 10, 2006.
English Translation of Office Action for Japanese Application No. 2006-088348, mailed Jan. 4, 2011.
International Search Report and Written Opinion for PCT/US04/30769, mailed Oct. 4, 2005.
International Search Report and Written Opinion for PCT/US04/30683, mailed Feb. 10, 2006.
International Search Report and Written Opinion for PCT/US04/30684, mailed Feb. 10, 2006.
Extended Supplementary European Search Report for Application No. 07796005.2, mailed Feb. 14, 2012.
Aerohive Blog, posted by Devin Akin, Cooperative Control: Part 3, [Online] Retrieved from the Internet: <URL: http://blog.aerohive.com/blog/?p=71> Mar. 1, 2010 (3 pages).
Wikipedia, Wireless LAN, 2 definitions for wireless LAN roaming, [Online] [retrieved Oct. 4, 2010] Retrieved from the Internet: <URL: http://en.wikipedia.org/wiki/Wireless_LAN> (1 page).

Office Action for Canadian Application No. 2,638,754, mailed Oct. 3, 2011.
U.S. Appl. No. 12/957,997, filed Dec. 1, 2010.
Final Office Action for U.S. Appl. No. 12/489,295, mailed Jan. 18, 2012.
Office Action for U.S. Appl. No. 11/351,104, mailed Feb. 15, 2012.
Office Action for U.S. Appl. No. 12/370,562, mailed Jan. 17, 2012.
Office Action for U.S. Appl. No. 12/683,281, mailed Jan. 20, 2012.
Final Office Action for U.S. Appl. No. 12/304,100, mailed Feb. 2, 2012.
Final Office Action for U.S. Appl. No. 12/077,051, mailed Oct. 25, 2011.
Final Office Action for U.S. Appl. No. 12/113,535, mailed Jan. 3, 2012.
Final Office Action for U.S. Appl. No. 11/852,234, mailed Jan. 20, 2012.
Final Office Action for U.S. Appl. No. 12/350,927, mailed Jan. 18, 2012.

* cited by examiner

PICKING AN OPTIMAL CHANNEL FOR AN ACCESS POINT IN A WIRELESS NETWORK

CROSS-REFERENCE TO RELATED APPLICATION

This application claims priority to U.S. Patent Application No. 61/190,576, filed Aug. 29, 2008, entitled "Picking an Optimal Channel for an Access Point in a Wireless Network" which is hereby incorporated by reference in its entirety.

BACKGROUND

Auto-RF tuning allows wireless controller systems to automatically assign a channel number and/or power level for access point (AP) radios. This is useful in deployments where no network planning is desired and customers wish to have their controller system automatically start working without any configuration done for AP radio channel numbers and power values. A main functionality of auto-RF is dynamic channel assignment, to detect and adapt to changes in RF environments in a dynamic and intelligent fashion. Improving auto-RF is a topic of ongoing research.

SUMMARY

A novel technique for picking a channel for an access point (AP) in a wireless network involves evaluating a real-time environment of a channel based on a nonlinear function of the number of neighbor radios and channel utilization requirements. The technique can be used to pick a channel for an AP that is added to a wireless network or to tune a channel for an existing AP. The technique can be applied to, for example, a relatively new wideband option in the 802.11n standard.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
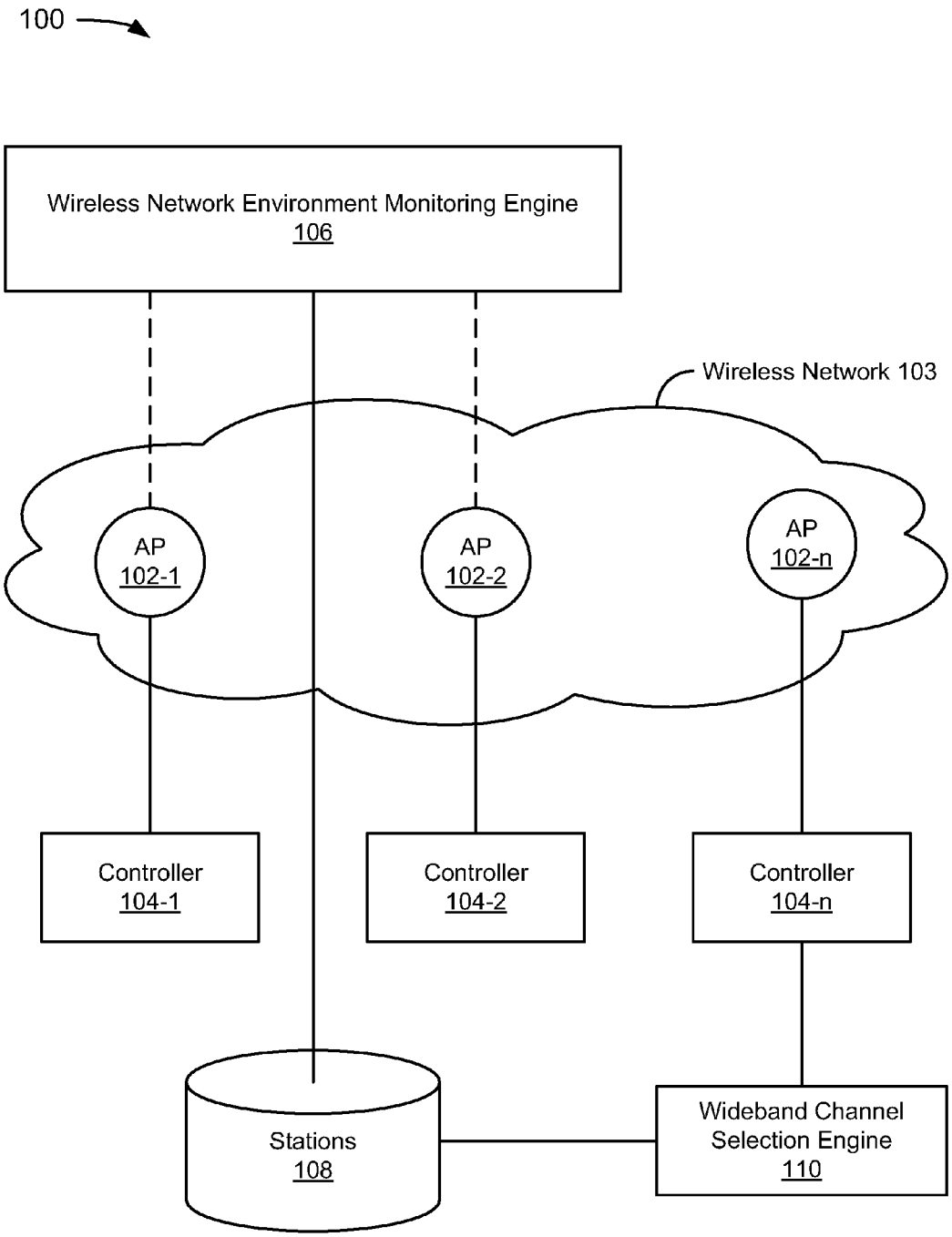
FIG. 1 depicts an example of a system for picking a channel for an access point (AP) in a wireless network.

FIG. 1 depicts an example of a system 100 for picking a channel for an access point (AP) in a wireless network. FIG. 1 includes APs 102-1 to 102-N (referred to collectively as APs 102), controllers 104-1 to 104-N (referred to collectively as controllers 104), a wireless network environment monitoring engine (WNEM engine) 106, a stations database 108, and a wideband channel selection (WCS) engine 110. Advantageously, the system 100 can be used to allocate a relatively under-utilized channel to an AP (e.g., the AP 102-N) when the AP is added to the wireless network. The system 100 can be used to auto-tune any or all of the APs 102 while the system is operational. The system 100 can be used to allow intelligent switching from narrowband to wideband when a station (not shown) enters an area with wideband.

In the example of FIG. 1, the APs 102 can include wireless access points (APs), mesh points, mesh point portals, mesh APs, mesh stations, client devices, or other known or convenient devices for acting as a wireless network access location. The APs 102 typically include at least one radio and in other respects can be implemented as hardware, firmware, software implemented in a computer-readable medium and executed by a processor, or a combination thereof. The APs 102 are stations that can establish a wireless connection with other stations. Stations can include any applicable computing device capable of wireless communication, for example a notebook computer, a wireless phone, or a personal digital assistant (PDA).

Computer-readable media include all applicable known or convenient storage media that a computer can read. As used herein, computer-readable medium is intended to encompass all statutory computer-readable media, and explicitly exclude all non-statutory computer-readable media. Currently, statutory requirements for computer-readable media exclude signals having the software embodied thereon, and include memory (including registers, cache, RAM, and non-volatile storage) of a general-purpose or special-purpose computer.

A wireless network 103 typically defines the range at which the APs 102 can operate. Stations that associate with one of the APs 102 can be referred to as "on" the wireless network. It is possible to extend the range of the wireless network using untethered APs or equivalent technology. For illustrative purposes, these technologies are largely ignored in this paper because an understanding of such technologies is unnecessary for an understanding of the teachings herein. Similarly, overlapping and ad hoc wireless networks are largely ignored in this paper because an understanding of such concepts is unnecessary for an understanding of the teachings herein.

The wireless network 103 can be coupled to another network (not shown). An example of another network may be any type of communication network, such as, but not limited to, the Internet or an infrastructure network. The term "Internet" as used herein refers to a network of networks which uses certain protocols, such as TCP/IP, and possibly other protocols, such as the hypertext transfer protocol (HTTP), for hypertext markup language (HTML) documents that make up the World Wide Web (the web).

In the example of FIG. 1, the controllers 104 can be implemented as hardware, firmware, software implemented in a computer-readable medium and executed by a processor, or a combination thereof. The controllers 104 can be distinct physical or logical devices, or some or all of the functionality of the various controllers 104 can be combined on the same physical device, and/or have shared logic. For illustrative convenience, each of the APs 102 is coupled to an associated controller 104. For example, the AP 102-1 is coupled to the controller 104-1.

The controllers 104 may or may not be "on" one or more of the APs 102. APs that have the functionality of a controller are sometimes referred to as "smart APs", though in some cases smart APs may have a subset of the controller functionality, and still operate in coordination with an external controller.

In the example of FIG. 1, the WNEM engine 106 can be implemented as hardware, firmware, software implemented in a computer-readable medium and executed by a processor, or a combination thereof. The WNEM engine 106 is coupled to the APs 102, and can be implemented on a wired device, such as a server, or distributed across various system components. For illustrative convenience, it is assumed that the WNEM engine 106 "listens to" the wireless network associated with the APs 102, and therefore includes wireless access to the wireless network. However, it should be understood that in an alternative description where the WNEM engine 106 is characterized as having no direct wireless access, the WNEM engine 106 can be forwarded data from, for example, the APs 102. The WNEM engine 106 monitors the wireless network. In certain implementations and/or cases, characteristics of the wireless network associated with channel utilization are most relevant.

In the example of FIG. 1, the stations database 108 is coupled to the WNEM engine 106. The stations database 108 can be implemented as hardware, firmware, software implemented in a computer-readable medium and executed by a processor, or a combination thereof. The stations database 108 stores data associated with stations on the wireless network. In certain implementations and/or cases, data associated with neighboring APs is of particular relevance.

The term "database," as used in this paper, is intended to have the broadest possible reasonable meaning. Thus, the database includes any data storage that allows meaningful access to the data. Examples of databases include conventional commercial databases, as well as comma-delimited data files (or other equivalently delimited files), practically any data structure (e.g., objects, tables, arrays, etc.), and any other applicable structure that facilitates convenient access to data. For illustrative convenience, databases are also assumed to have the appropriate database interfaces, if needed.

In the example of FIG. 1, the WCS engine 110 is coupled to the stations database 108. The WCS engine 110 can be implemented as hardware, firmware, software implemented in a computer-readable medium and executed by a processor, or a combination thereof. The WCS engine 110 uses data from the stations database 108 to intelligently select channels for one or more of the APs 102. The WCS engine 110 can select a channel for an AP specifically, or select channels for multiple APs as part of a global tuning configuration. In alternative embodiments, the WCS engine 110 could be distributed across the APs 102 and/or controllers 104, or implemented, in whole or in part, in the WNEM engine 106.

In the example of FIG. 1, in operation, the WNEM engine 106 monitors the APs 102-1 and 102-2 (it may monitor additional APs, but this is not necessary for the example described here). The WNEM engine 106 stores data associated with the APs 102-1, 102-2, which can include data associated with other stations within range of the APs 102-1, 102-2, in the stations database 108. The WCS engine 110 uses data from the stations database 108 to determine an optimal channel for the AP 102-N. The controller 104-N commands the AP 102-N to use the optimal channel. It may be noted that the phrase "picking a channel" as used in this paper includes picking a channel for an AP that is newly added to the wireless network (or newly considered for whatever reason) and includes tuning a channel for an AP that is already on the wireless network.

Advantageously, a utility function that grows nonlinearly by the number of neighbor APs can be used to evaluate and/or predict channel conditions. The more neighbor APs that exist, the higher channel usage on average that can be anticipated. Typically it would be desirable to tune away from the higher channel usage when lower channel capacity is available to a target AP. Past channel utilization characteristics can also be considered. The total number of neighbor APs is a prediction for the future channel utilization, while the past values tell the historic or current channel usage behaviors. A mix of using both values can provide a more comprehensive channel evaluation than using only one or the other.

Figure 2:
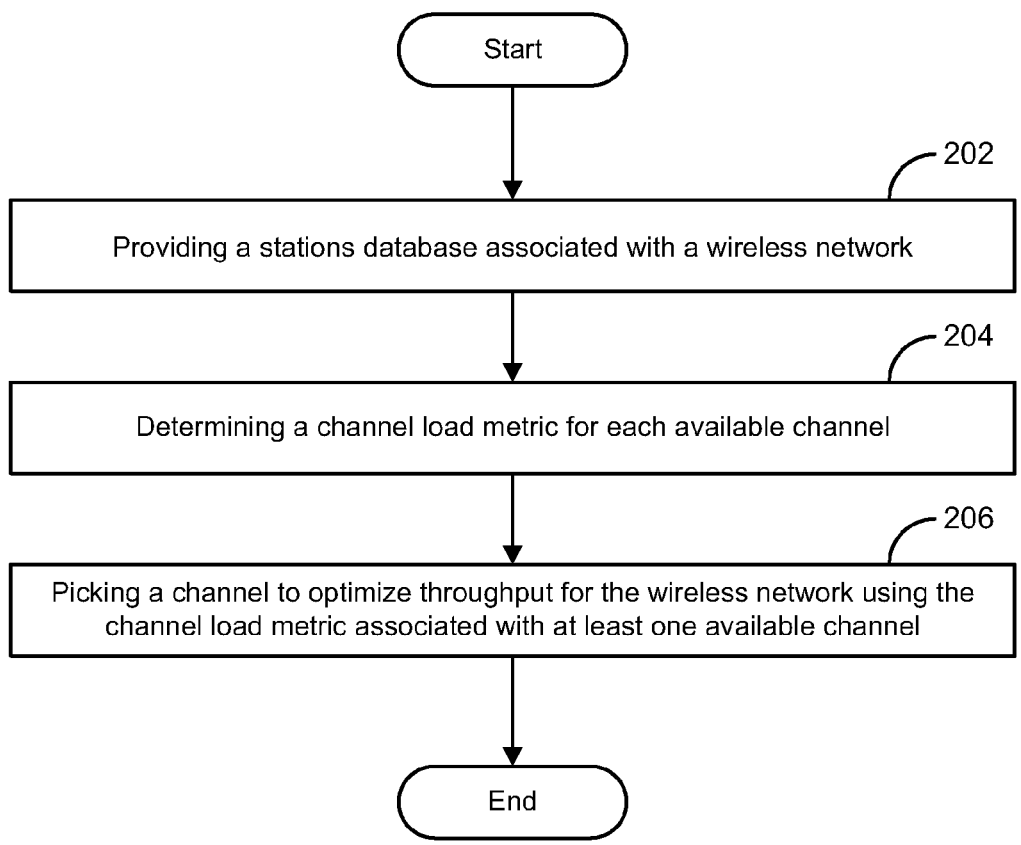
FIG. 2 depicts a flowchart of an example of a method for picking a channel for an AP on a wireless network.

FIG. 2 depicts a flowchart 200 of an example of a method for picking a channel for an AP on a wireless network. The method is organized as a sequence of modules in the flowchart 200. However, it should be understood that these, and modules associated with other methods described herein, may be reordered for parallel execution or into different sequences of modules.

In the example of FIG. 2, the flowchart 200 starts at module 202 with providing a station database associated with a wireless network. The station database may be similar to the station database 108 (FIG. 1), or may be dissimilar. Typically, providing the station database includes monitoring the wireless network to obtain an up-to-date station database, but providing the station database could also or instead include historic data associated with the wireless network.

In the example of FIG. 2, the flowchart 200 continues to module 204 with determining a channel load indicator for each available channel. A channel load indicator is a known or convenient value that is indicative of channel utilization. In general, it might be more desirable to pick for an AP a channel that has low channel utilization. For convenience in this paper, it is often assumed that a channel load indicator that has a "low" value is associated with a channel having low channel utilization. Examples of how to determine a channel load indicator are described later with reference to FIGS. 3 and 4.

In the example of FIG. 2, the flowchart 200 continues to module 206 with picking a channel to optimize throughput for the wireless network using the channel load indicator associated with at least one available channel. In practice, it may or may not be desirable to use the channel load indicators associated with each available channel. However, there may be a policy reason for considering only a subset (or one) of the possible channels. It should be noted that an algorithm for determining channel load indicators for each available channel could stop upon finding a channel load indicator associated with a free or relatively free channel. For the purposes of this example, it is assumed that in such a case the channel load indicator of the free or relatively free value is 0 and all other channel load indicators are 1. In this way, each channel has an associated channel load indicator. Examples of how to pick a channel to optimize throughput for the wireless network are described later with reference to FIG. 5.

Figure 3:
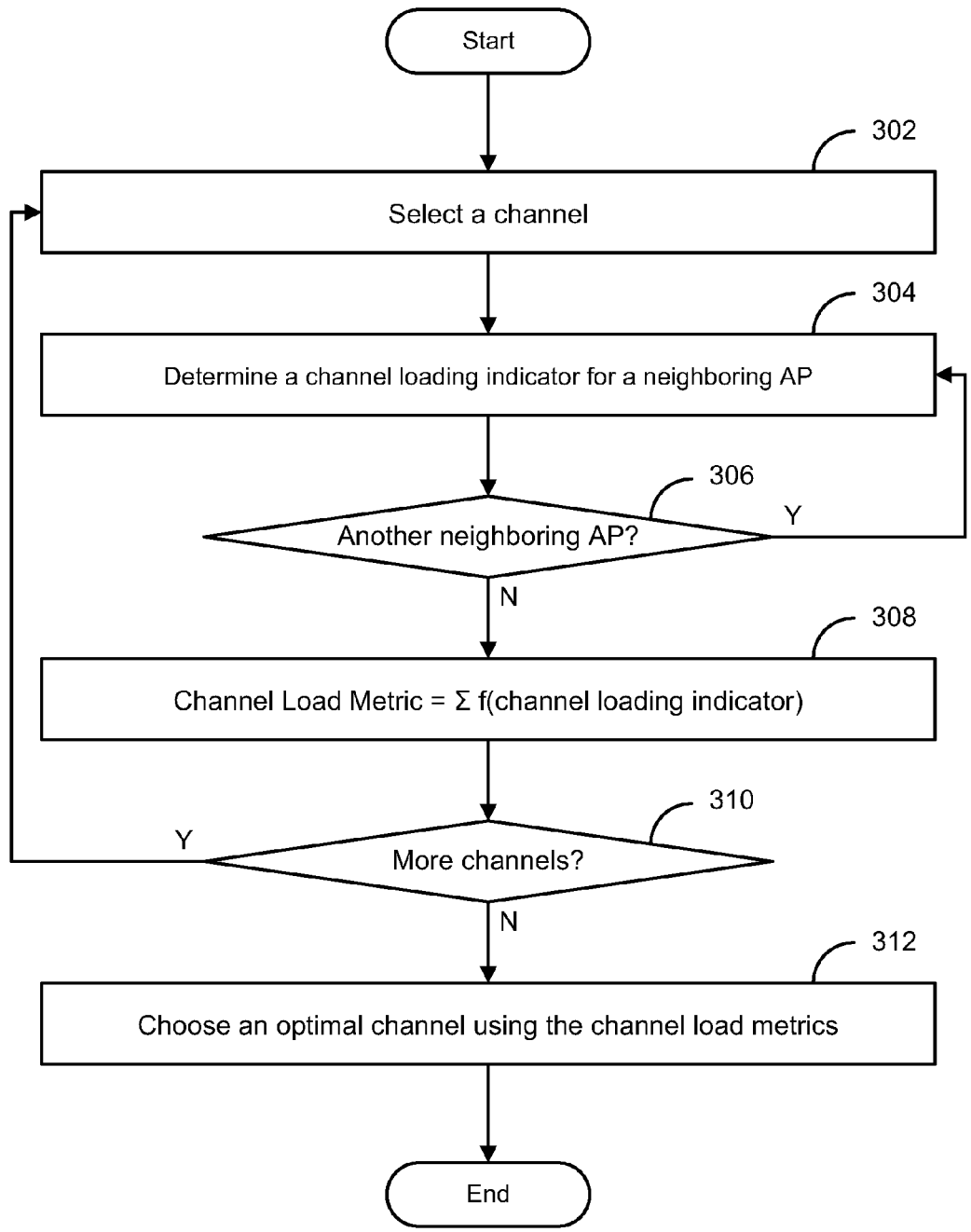
FIG. 3 depicts an example of a flowchart of a method for calculating a channel utilization value.

FIG. 3 depicts an example of a flowchart 300 of a method for calculating a channel utilization value. In the example of FIG. 3 the flowchart 300 starts at module 302 with selecting a channel. The intention when selecting the channel is to eventually cycle through each channel available to an AP to find the optimal channel for the AP. What is meant be "each channel" is each channel that is considered. This may be a subset of all channels. For example, policies may prohibit the use of certain channels for certain data types, or the algorithm might search for a relatively open channel and stop when one is found (which means "each channel" refers only to those channels that were considered before the algorithm stopped). For illustrative simplicity in this example, it is assumed that a channel is selected on a per-AP basis, rather than by way of a global tuning algorithm.

In the example of FIG. 3, the flowchart 300 continues to module 304 with determining a channel loading indicator for a neighboring AP. One example of a convenient channel loading indicator is a relative signal strength indicator (RSSI). Although the RSSI is a convenient characteristic to measure, due to its ubiquity in wireless networks, any applicable known or convenient characteristic could be used. For example, the channel loading indicator could be associated with a signal-to-noise ratio (SNR). Another example might be to calculate from a noise floor associated with an AP. Any applicable known or convenient technique can be used so long as the technique has at least some correlation with channel loading. What is meant by "neighboring AP" is an AP that is within range of an AP for which a channel is being picked. To be within range of the AP, neighboring APs must be detectable.

In the example of FIG. 3, the flowchart 300 continues to decision point 306 where it is determined whether there is another neighboring AP. If it is determined that there is another neighboring AP (306-Y), then the flowchart 300 returns to module 304 and continues as described previously. If, on the other hand, it is determined that there are no more neighboring APs (306-N), then the flowchart 300 continues to module 308 where functions of the channel loading indicators are combined to obtain a channel load metric for the currently considered channel.

The summation symbol, $\Sigma$, is used in this paper for illustrative simplicity. The channel loading indicators can be combined in any applicable known or convenient manner so long as the result is a meaningful channel load metric, including values from which a meaningful channel loading metric can be derived.

There are several options for the function, f( ). Some good candidates for f( ) include but are not limited to $\log\_M(N)$ or $(N)^{\{1/M\}}$, e.g., $\log\_10( )$ or $sqrt( )$. The good characteristics of these functions are that they give more weight to the same number increment when N is small. This is more realistic, where having one more neighbor when N=4 apparently has more impact than having one more neighbor when N=30. Here are three specific examples:

1) utilization index=$50*\log\_10(N)+U$, where U is a channel utilization value;
2) utilization index=$20*\log\_2(N+1)+U$;
3) utilization index=$10*sqrt(N)+U$.

With example 1, N=1 would anticipate a 50% channel time, while N=100 would anticipate a 100%. This might be a good choice since N=100 is rare to see in some practical implementations.

With example 2, N=1 would anticipate a 20% channel time, while N=31 would anticipate a 100%. N=31 might be too small to anticipate a 100% in some practical implementations.

With example 3, N=1 would anticipate a 10% channel time, N=4 would be 20%, N=25 would be 50%, while N=100 would anticipate a 100%.

In general, it may be desirable to consider computing costs when choosing a function, f( ). In this respect, sqrt( ) might be more preferable than using a logarithm. Also, it may be good to choose an f( ) with parabola fitting well with a real scenario.

N can be replaced by giving weight to neighbors by their channel loading indicator. E.g., $N=\Sigma(f(RSSI))$ or $N=\Sigma(f(SNR))$, where f( ) includes a weighting functionality. Also, a noise floor can be put as a factor with an equation such as index=$u*f(N+c)+U+f(NF)$.

It may be useful for the function of the channel loading indicator to provide results that do not change the order of the channel loading indicators considered. For example, if the channel loading indicator is RSSI, $RSSI_x > RSSI_y \rightarrow f(RSSI_x) > f(RSSI_y)$. However, while useful for logical simplicity, this is not, strictly speaking, a requirement. It should further be noted that the function could be an identity function. That is, the actual value of the channel loading indicators could be combined.

It should be noted that an AP on a second channel that is right next to a first channel could interfere with throughput of an AP using the first channel. Normally, the signal power spectrum is degraded by about 30 dB when it penetrates into a neighboring channel. If a signal's RSSI is strong enough (say >−60 dBm), it is likely to reduce the neighbor channel's throughput. So, rather than simply sum the functions of RSSI values to obtain a channel load metric, it may be desirable to use the following formula: channel load metric=$\Sigma_i f(RSSI_i) + \Sigma_j f(RSSI_j - A)$, where j refers to the jth AP seen on the neighbor channel and A represents the adjacent channel rejection level, e.g. 30 dB.

In the example of FIG. 3, the flowchart 300 continues to decision point 310 where it is determined whether there are more channels available to the AP. If it is determined that there are more channels available to the AP (310-Y), then the flowchart 300 returns to module 302 and continues as described previously. If, on the other hand, it is determined that there are no more channels available to the AP (310-N), then the flowchart 300 continues to module 312 where an optimal channel is chosen using the channel load metrics.

Figure 4:
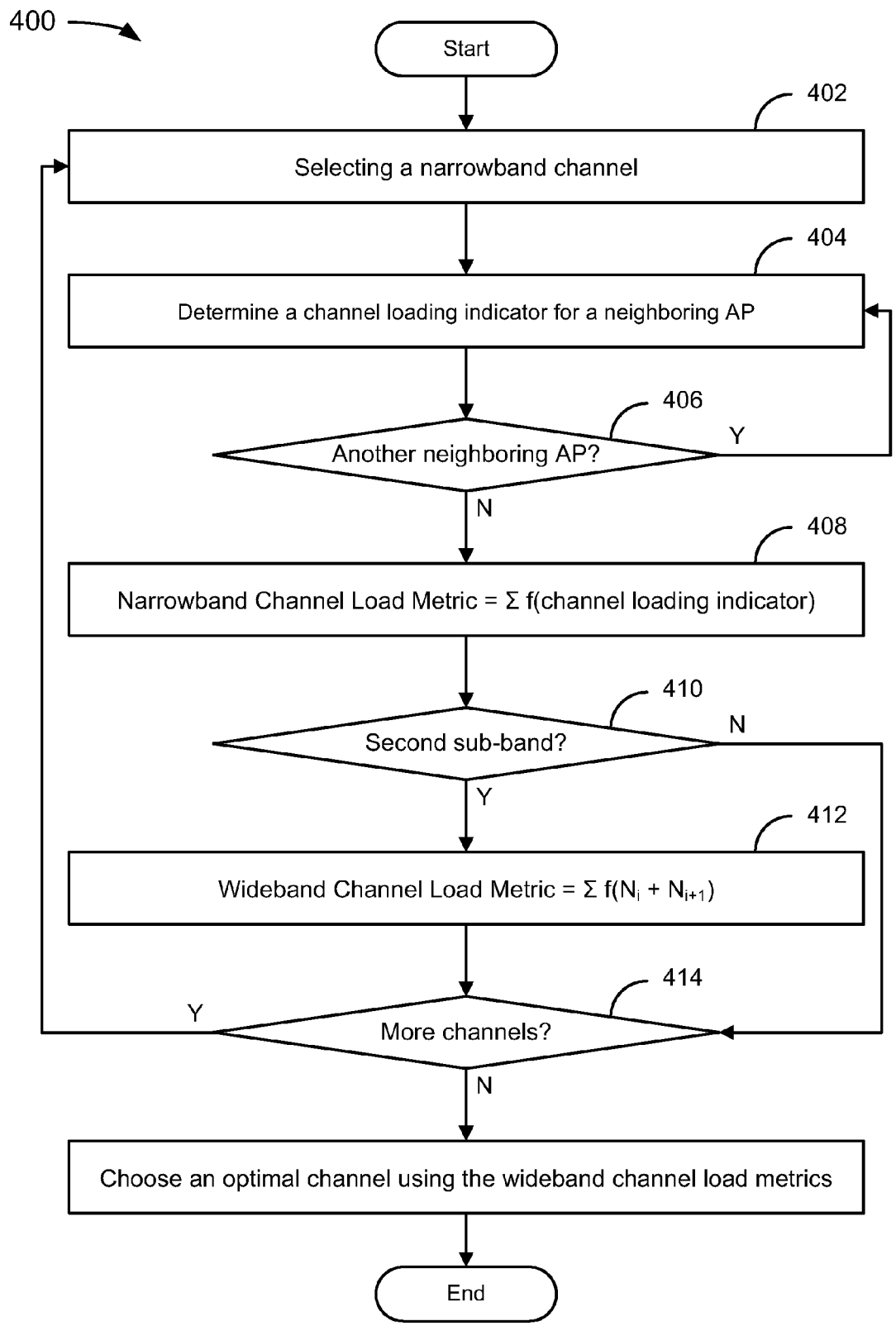
FIG. 4 depicts an example of a flowchart of a method for calculating a wideband channel utilization value.

FIG. 4 depicts an example of a flowchart 400 of a method for calculating a wideband channel utilization value. In the example of FIG. 4 the flowchart 400 starts at module 402 with selecting a narrowband channel. For the purposes of this paper, a narrowband channel is the smallest sub-band of a band, as defined in a relevant wireless standard. For the purposes of this paper, a wideband channel encompasses multiple narrowband channels. While it is possible that a wideband channel could encompass a narrowband channel plus a fraction more, most well-known standards have relatively constant narrowband channels and wideband channels that include an integer number of narrowband channels. It may be noted, however, that some bands have one or more "extra" narrowband channels. For example, a wideband channel may include two narrowband channels, but the band in question might have an odd number of narrowband channels. In this paper, the narrowband that is not part of a wideband is referred to as an edge band.

In the example of FIG. 4, the flowchart 400 continues to module 404 with determining a channel loading indicator for a neighboring AP.

In the example of FIG. 4, the flowchart 400 continues to decision point 406 where it is determined whether there is another neighboring AP. If it is determined that there is another neighboring AP (406-Y), then the flowchart 400 returns to module 404 and continues as described previously. If, on the other hand, it is determined that there are no more neighboring APs (406-N), then the flowchart 400 continues to module 408 where functions of the channel loading indicators are combined to obtain a narrowband channel load metric for the currently considered channel.

Calculating a narrowband channel loading metric is optional in the sense that the purpose of the example of FIG. 4 is to calculate a wideband channel load metric. However, one way to calculate a wideband channel load metric is by taking a function of constituent narrowband channel loading metrics. Depending on the implementation and/or configuration of the system, the narrowband channel loading metric can also be calculated for archival purposes or to aid in a determination regarding whether an AP should use a narrowband or wideband channel.

In the example of FIG. 4, the flowchart 400 continues to decision point 410 where it is determined whether the just-considered band is a second sub-band of a wideband channel. For illustrative convenience, it is assumed that a wideband channel covers two narrowband channels. The teaching can be expanded naturally to include wideband channels that cover some other multiple of narrowband channels, or fractions thereof.

If it is determined that the just-considered band is a second sub-band, $N_{i+1}$, of a wideband channel (410-Y), then the flowchart 400 continues to module 412 with where a function of the channel utilization values of the previously considered band, $N_i$, and the just-considered band, $N_{i+1}$, are combined to obtain a wideband channel load metric.

If, on the other hand, it is determined that the just-considered band is not a second sub-band of a wideband channel (410-N), or in any case after the wideband channel utilization value is generated, the flowchart 400 continues to decision point 414 where it is determined whether there are more channels available to the AP. If it is determined that there are more channels available to the AP (414-Y), then the flowchart 400 returns to module 402 and continues as described previously. If, on the other hand, it is determined that there are no more channels available to the AP (414-N), then the flowchart 400 continues to module 416 where an optimal channel is chosen using the wideband channel load metrics. In some implementations and/or configurations the optimal channel may only be a wideband channel. In other implementations and/or configurations, the optimal channel may be either a narrowband channel or a wideband channel. In this case, presumably the narrowband channel load metrics are also used to choose an optimal channel.

Figure 5:
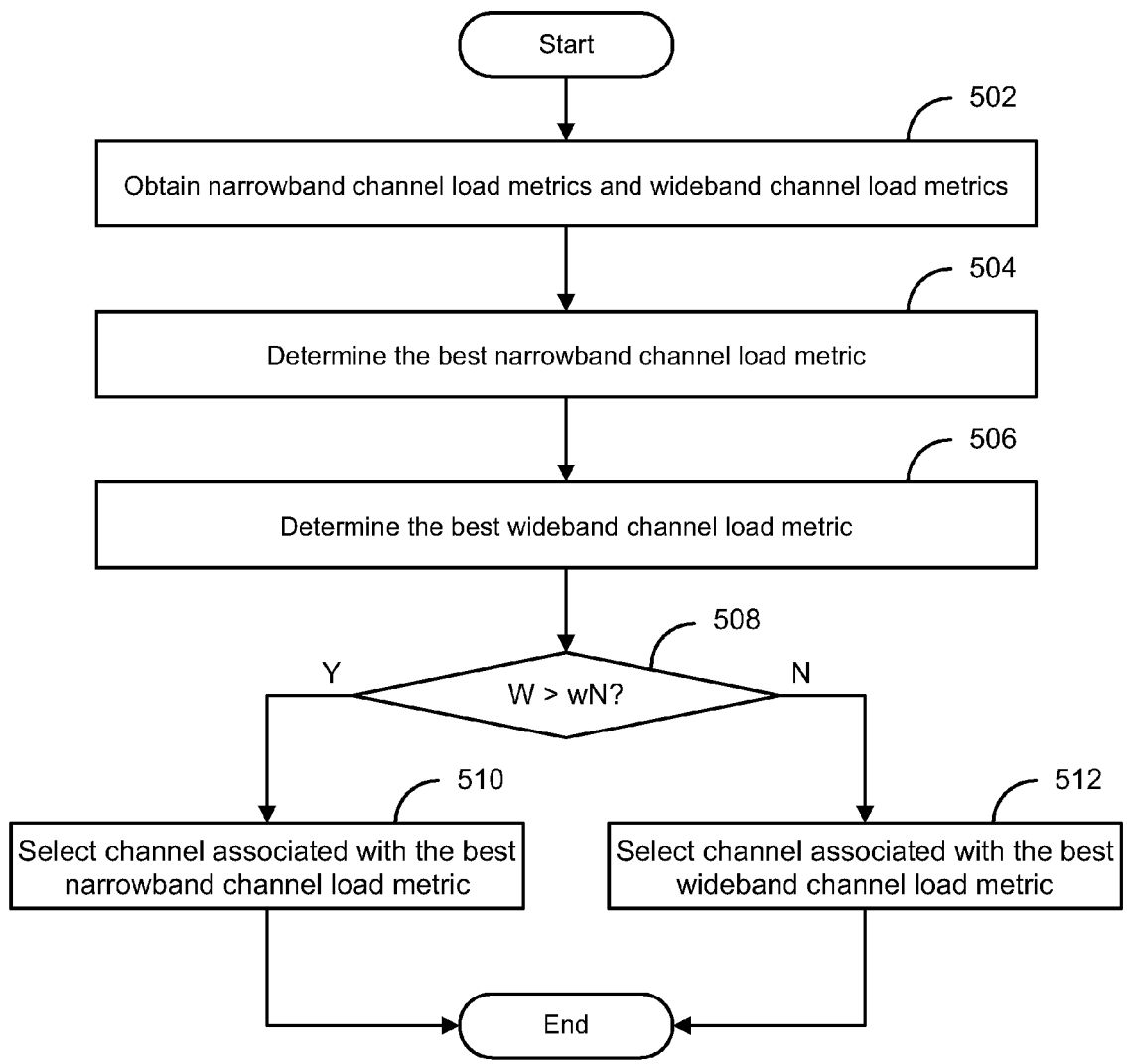
FIG. 5 depicts an example of a flowchart of a method for picking a channel to optimize throughput for a wireless network.

FIG. 5 depicts an example of a flowchart 500 of a method for picking a channel to optimize throughput for a wireless network. Picking a channel in wireless networks is made more difficult by the introduction of both narrowband and wideband channels. The IEEE 802.11n system with wideband is coming so there will be challenges accommodating wideband and narrowband (e.g., conventional 20 MHz band) APs. Under the assumption that primary channel overlap with a secondary channel is discouraged in 40 MHz BSS, a higher weight (e.g., double) can be assigned to the secondary channel of neighbors when calculating a channel utility index. Using a formula similar to that described with reference to FIG. 3 to determine a channel load metric, the following formula is useful: $C=N_1+w*N_2$. $N_1$ refers to the number of neighbors whose primary channel is the same as the evaluated channel and $N_2$ refers to the number of neighbors whose secondary channel is the same as the evaluated channel. C can be used by any channel evaluation algorithm, in the same way as the number of neighbors is used in evaluating 20 MHz channels.

In the example of FIG. 5, the flowchart 500 starts at module 502 with obtaining narrowband channel load metrics and wideband channel load metrics. These metrics can be obtained in a manner similar to that described with reference to FIGS. 3 and 4, or in some other applicable known or convenient manner.

In the example of FIG. 5, the flowchart 500 continues to module 504 with determining the best narrowband channel load metric. While the values of the narrowband channel load metrics are implementation-specific, a best value is typically a lowest number, which corresponds to a lowest channel utilization. Of course, it is trivial to make the best value the highest number (e.g., by the equivalent of multiplying a number by −1). It should be noted that the best narrowband channel load metric is not necessarily associated with the narrowband channel having the lowest channel utilization, but, assuming there are no other policies or rules dictating otherwise, the best narrowband channel load metric would be associated with the preferably (but not guaranteed) lowest channel utilization. In this paper, this preference is indicated by referring to the best channel utilization as a best predicted channel utilization.

In the example of FIG. 5, the flowchart 500 continues to module 506 with determining the best wideband channel load metric. Again, although the best value is implementation-specific; a simple way to determine the best wideband channel load metric is by selecting the lowest value.

In the example of FIG. 5, the flowchart 500 continues to decision point 508 where it is determined whether the best wideband channel load metric, W, is greater than the best narrowband channel load metric times a weight, wN. How to decide the value of the weight 'w' is discussed later. For the purposes of this example, it is sufficient to note that the system can be configured to encourage or discourage wideband channel use over narrowband channel use by increasing or decreasing the weight multiple of the narrowband channel. If it is determined that the best wideband channel load metric is greater than the weighted best narrowband channel load metric (508-Y), then the flowchart 500 continues to module 510 where the channel associated with the best narrowband channel load metric is selected. If, on the other hand, it is determined that the best wideband channel load metric is not greater than the weighted best narrowband channel load metric (508-N), then the flowchart 500 continues to module 512 where the channel associated with the best wideband channel load metric is selected.

It should be noted that the best narrowband channel utilization value could be associated with an edge narrowband channel that is not a part of any wideband channel. Depending upon the implementation of a system that has narrowband channels that are not part of any wideband channel, such channels could be made unavailable, favored for narrowband traffic, or treated as any other narrowband channel.

When comparing a 40 MHz channel to a 20 MHz channel, an example of a criterion could be: if $(f_{40}(N_{40})>w*f_{20}(N_{20}))$ then choose the 20 MHz channel, where f is defined as the channel utilization expectation, N as a parameter that might be decided using any previously described, known, or convenient technique, and was a weight factor.

There could be a number of reasons to choose various values for w. For example, if radios are doing MPDU aggregation, throughput is roughly twice as high on 40 MHz channels than on 20 MHz channels. So, it may be advantageous to set w close to 2. For radios not supporting aggregation, the throughputs are quite close for 40 MHz (drop down 75%) or 20 MHz channels (drop down almost half). In this situation, it may be advantageous to set w close to 1.2.

Another possible way to choose a value for w is to consider actual values and pick a number that makes sense given the throughput characteristics.

Another possible way to choose a value for w is to consider that voice only needs a narrow band. It may be advantageous to choose a large value of w for channels with a high percentage of voice traffic (e.g., if a majority of traffic is expected to be voice on a given channel). Similarly, a system could be configured such that a particular AP serves voice, while another AP serves data. In such cases, the various APs may have different associated values of w.

For APs that are already on the wireless network, it may be desirable to require that the channel load metric of the predicted optimal channel is less than the channel load metric of the AP's current channel by more than a tuning threshold, T. I.e., $C_{current}-C_{new}>T$, assuming the lower the value of C, the more (predicted) optimal the channel. The tuning threshold is useful to reduce the likelihood that an AP will switch back and forth between channels as estimated channel usage fluctuates over time.

Figure 6:
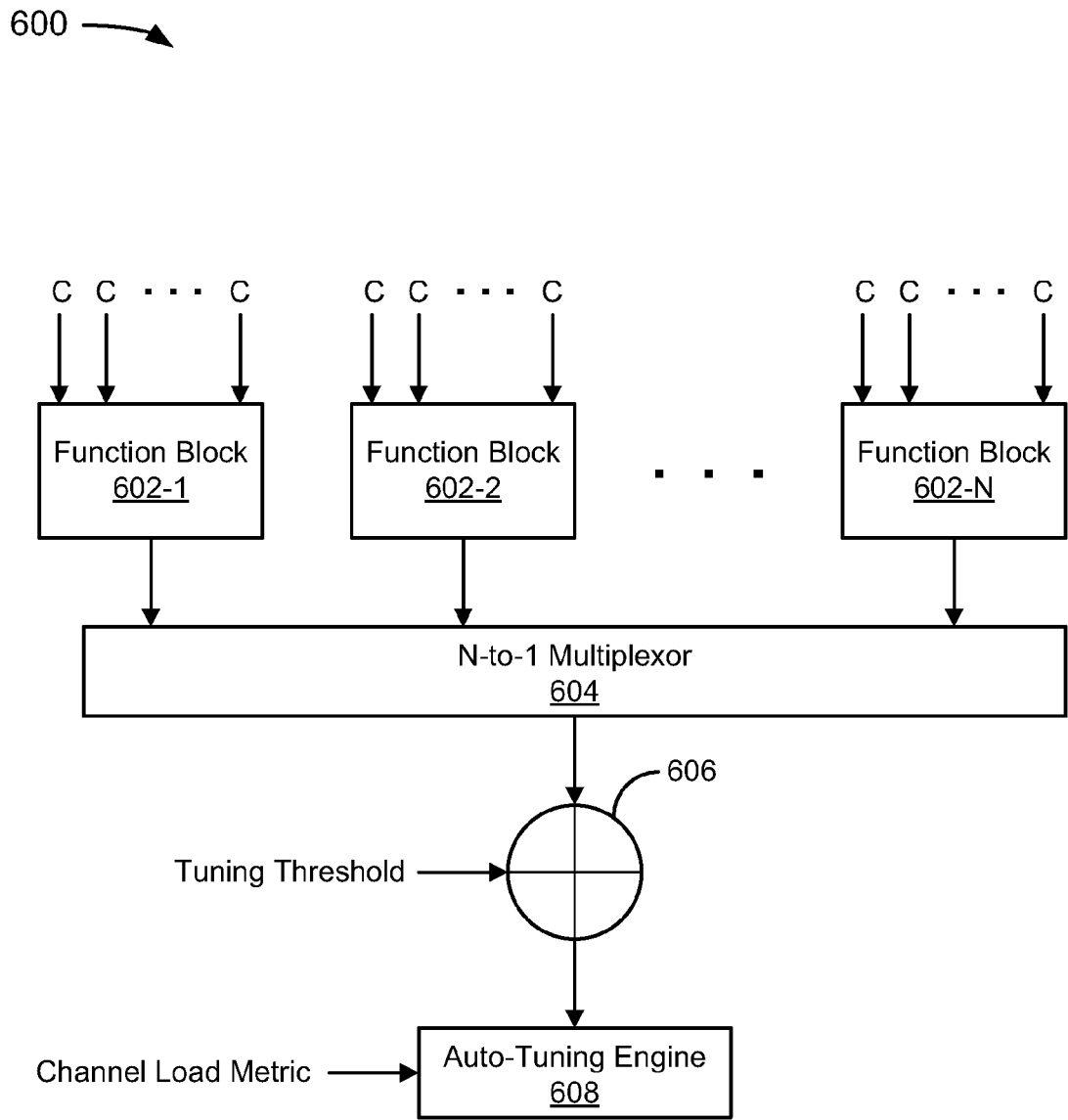
FIG. 6 depicts a conceptual diagram of an example of a process for determining whether to switch channels when auto-tuning.

FIG. 6 depicts a conceptual diagram 600 of an example of a process for determining whether to switch channels when auto-tuning. The diagram 600 includes a plurality of function blocks 602-1 to 602-N (referred to collectively as function blocks 602), an N-to-1 multiplexor 604, an adder 606, and an auto-tuning engine 608.

The function blocks 602 take as input a plurality of channel loading indicators, C, (e.g., one for each relevant neighboring AP on a channel), and output channel loading metrics for their associated channels, which are a combination of the channel loading indicators associated with the channel. The channel loading indicators may be pre-weighted based upon policy- or rules-based considerations.

The N-to-1 multiplexor 604 selects one of the channel loading metrics. For illustrative simplicity, it is assumed that the lowest-value channel loading metric is associated with the lowest (weighted) predicted channel utilization. It is further assumed that the channel with the lowest predicted channel utilization is the most desirable choice for auto-tuning. The output of the N-to-1 multiplexor 604 is, therefore, the lowest channel loading metric output from the function blocks 602. In any case, the term "best" is used in this paper to describe a value that is determined to be the most desirable, whether that value is the lowest, highest, or somewhere in between.

The adder 606 adds together the lowest channel loading metric output from the N-to-1 multiplexor 604 and a tuning threshold. The tuning threshold may be a constant or a variable, and may be set in accordance with policy, practical observations, etc. Any known or convenient algorithm or rule to set the tuning threshold value can be used, keeping in mind the goal is to auto-tune channels such that an AP doesn't switch back and forth between channels relatively frequently, but does switch when channel utilization, throughput, or other traffic characteristics can actually be improved.

The auto-tuning engine 608 takes as inputs the output of the adder 606 and a channel load metric associated with a channel that an AP is currently on. The auto-tuning engine 608 changes to the channel associated with the lowest channel load metric if the lowest channel load metric plus the threshold is lower than the channel load metric associated with the channel that the AP is currently on. The auto-tuning engine 608 does not change channels otherwise. In this way, the AP will not switch to a channel if channel utilization is only nominally (however that is defined by way of setting the tuning threshold value) better.

Due to high computing costs when using nonlinear functions to calculate channel load metric, an alternative is to use an adjustable threshold, instead of a fixed threshold, when deciding whether to change channels. If it is assumed a channel load metric increases linearly as the number of neighbors grows, a threshold can be designed to adjust accordingly (e.g., $T=index_{current}*10\%$) and only change channels if $(index_{current}-index_{new})>T$. This example has a low computing cost. Since channel utilization, U, is not incorporated into the index calculation in this example, this works well for simulating a nonlinear effect on the f( ) function. However, if U is counted, this example may not be ideal because U should not be nonlinear like the portion calculated from the number of neighbors.

Figure 7:
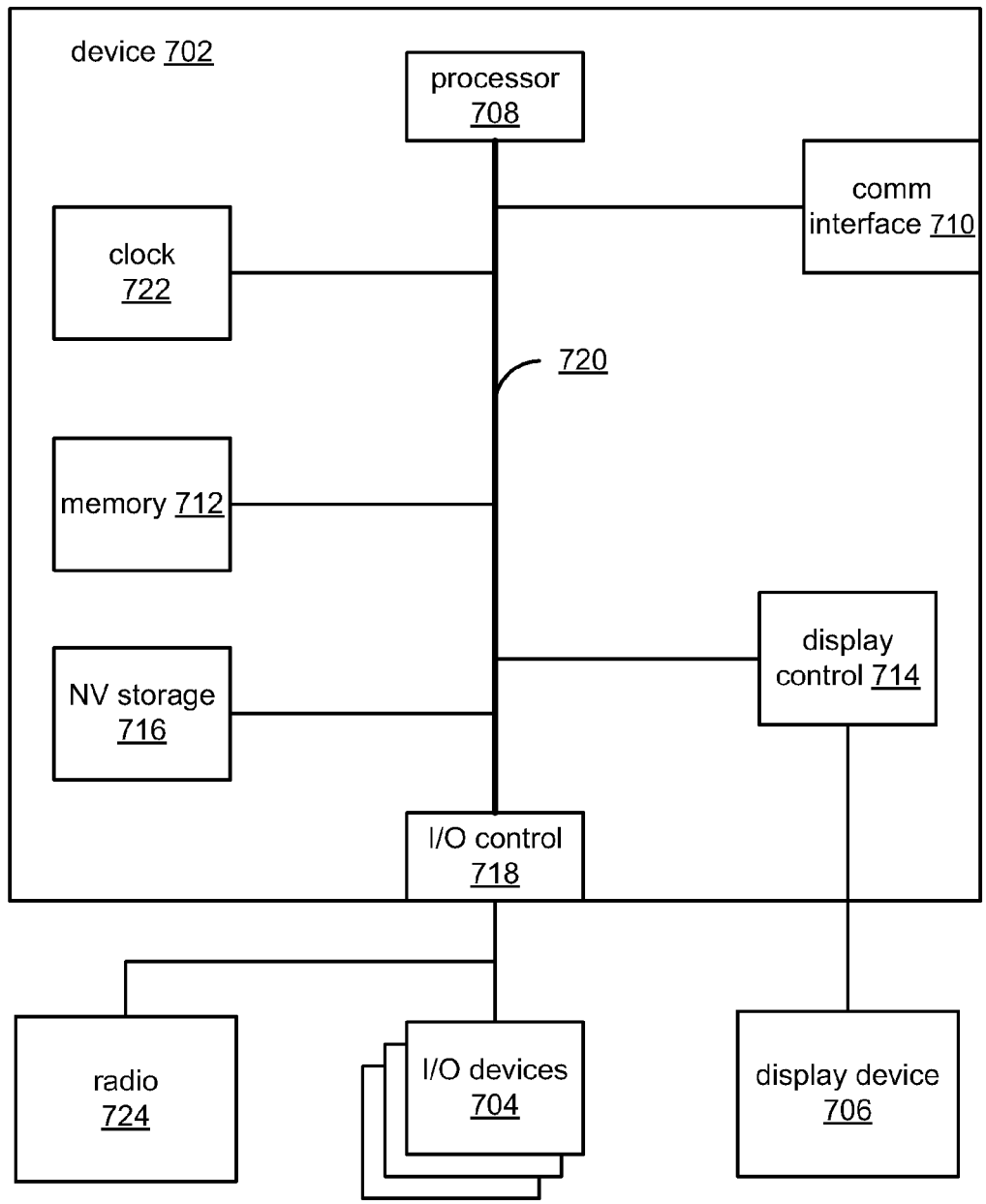
FIG. 7 depicts an example of a system capable of performing techniques described in this paper.

FIG. 7 depicts an example of a system 700 capable of performing techniques described in this paper. The system 700 may be a conventional computer system that can be used as a client computer system, such as a wireless client or a workstation, or a server computer system. The system 700 includes a device 702, I/O devices 704, and a display device 706. The device 702 includes a processor 708, a communications interface 710, memory 712, display controller 714, non-volatile storage 716, I/O controller 718, clock 722, and radio 724. The device 702 may be coupled to or include the I/O devices 704 and the display device 706.

The device 702 interfaces to external systems through the communications interface 710, which may include a modem or network interface. It will be appreciated that the communications interface 710 can be considered to be part of the system 700 or a part of the device 702. The communications interface 710 can be an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 708 may be, for example, a conventional microprocessor such as an Intel Pentium microprocessor or Motorola power PC microprocessor. The memory 712 is coupled to the processor 708 by a bus 720. The memory 712 can be Dynamic Random Access Memory (DRAM) and can also include Static RAM (SRAM). The bus 720 couples the processor 708 to the memory 712, also to the non-volatile storage 716, to the display controller 714, and to the I/O controller 718.

The I/O devices 704 can include a keyboard, disk drives, printers, a scanner, and other input and output devices, including a mouse or other pointing device. The display controller 714 may control in the conventional manner a display on the display device 706, which can be, for example, a cathode ray tube (CRT) or liquid crystal display (LCD). The display controller 714 and the I/O controller 718 can be implemented with conventional well known technology.

The non-volatile storage 716 is often a magnetic hard disk, flash memory, an optical disk, or another form of storage for large amounts of data. Some of this data is often written, by a direct memory access process, into memory 712 during execution of software in the device 702. One of skill in the art will immediately recognize that the terms "machine-readable medium" or "computer-readable medium" includes any type of storage device that is accessible by the processor 708.

Clock 722 can be any kind of oscillating circuit creating an electrical signal with a precise frequency. In a non-limiting example, clock 722 could be a crystal oscillator using the mechanical resonance of vibrating crystal to generate the electrical signal.

The radio 724 can include any combination of electronic components, for example, transistors, resistors and capacitors. The radio is operable to transmit and/or receive signals.

The system 700 is one example of many possible computer systems which have different architectures. For example, personal computers based on an Intel microprocessor often have multiple buses, one of which can be an I/O bus for the peripherals and one that directly connects the processor 708 and the memory 712 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 712 for execution by the processor 708. A Web TV system, which is known in the art, is also considered to be a computer system, but it may lack some of the features shown in FIG. 7, such as certain input or output devices. A typical computer system will usually include at least a processor, memory, and a bus coupling the memory to the processor.

In addition, the system 700 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 716 and causes the processor 708 to execute the various acts required by the operating system to input and output data and to store data in memory, including storing files on the non-volatile storage 716.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is Appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This Apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other Apparatus. Various general purpose systems may be used with programs in accordance with the teachings herein, or it may prove convenient to construct more specialized Apparatus to perform the required method steps. The required structure for a variety of these systems will appear from the description below. In addition, the present example is not described with reference to any particular programming language, and various examples may thus be implemented using a variety of programming languages.

What is claimed is:

1. A method comprising:
    selecting, by a device, a first narrowband channel;
    receiving first one or more channel loading indicators associated with respective one or more neighboring access points (APs) on the first narrowband channel;
    deriving a first channel load metric from the first one or more channel loading indicators;
    selecting a second narrowband channel;
    receiving second one or more channel loading indicators associated with respective one or more neighboring APs on the second narrowband channel;
    deriving a second channel load metric from the second one or more channel loading indicators;
    combining the first channel load metric and the second channel load metric to obtain a wideband channel load metric;
    if the wideband channel load metric is greater than the first channel load metric and the second channel load metric, sending a signal indicative of the wideband channel; and
    if the first channel load metric is greater than the wideband channel load metric and the second channel load metric, sending a signal indicative of the first narrowband channel.

2. The method of claim 1, wherein the wideband channel load metric is a first wideband channel load metric, further comprising:
    predicting a lower channel load on a first wideband channel associated with the first wideband channel load metric than on a second wideband channel associated with a second wideband channel load metric; and
    if the second wideband channel load metric is greater than the first channel load metric and the second channel load metric, picking the first wideband channel for use by an AP.

3. The method of claim 1, wherein the wideband channel load metric is a first wideband channel load metric, further comprising:
    predicting a lower channel load on a first wideband channel associated with the first wideband channel load metric than on a second wideband channel associated with a second wideband channel load metric; and
    auto-tuning an AP to the first wideband channel.

4. The method of claim 1, further comprising providing a stations database that includes data associated with APs.

5. The method of claim 1, further comprising providing a stations database that includes data associated with client stations.

6. The method of claim 1, further comprising:
obtaining a relative signal strength indicator (RSSI) associated with a first AP;
generating a first channel loading indicator of the first one or more channel loading indicators from a function of the RSSI associated with the first AP;
obtaining an RSSI associated with a second AP; and
generating a second channel loading indicator of the second channel loading indicators from a function of the RSSI associated with the second AP.

7. The method of claim 1, further comprising:
obtaining a signal-to-noise ratio (SNR) associated with a first AP;
generating a first channel loading indicator of the first one or more channel loading indicators from a function of the SNR associated with the first AP;
obtaining an SNR associated with a second AP; and
generating a second channel loading indicator of the second one or more channel loading indicators from a function of the SNR associated with the second AP.

8. The method of claim 1, wherein the wideband channel load metric is a first wideband channel load metric, further comprising:
selecting a third narrowband channel;
receiving third one or more channel loading indicators associated with respective one or more neighboring access points (APs) on the third narrowband channel;
deriving a third channel load metric from the third one or more channel loading indicators;
selecting a fourth narrowband channel;
receiving fourth one or more channel loading indicators associated with respective one or more neighboring APs on the fourth narrowband channel;
deriving a fourth channel load metric from the fourth one or more channel loading indicators; and
combining the third channel load metric and the fourth channel load metric to obtain a second wideband channel load metric.

9. The method of claim 1, further comprising:
calculating a first index from a function of each channel loading indicator associated with respective one or more neighboring APs on the first narrowband channel;
combining the indices to derive the first channel load metric;
calculating a second index from a function of each channel loading indicator associated with respective one or more neighboring APs on the second narrowband channel; and
combining the first index and the second index to derive the second channel load metric.

10. The method of claim 1, further comprising:
adding a tuning threshold to the wideband channel load metric;
determining that the wideband channel load metric plus the tuning threshold have a lower value than a current channel load metric; and
switching channels for an AP from a channel associated with the current channel load metric to a channel associated with the wideband channel load metric.

11. A system, comprising:
a wireless network environment monitoring engine configured to obtain data associated with stations in a wireless network;
the wireless network environment monitoring engine configured to store the data in a stations database;
a wideband channel selection engine configured to calculate narrowband channel load metrics for narrowband channels available to an access point (AP) based on the data associated with stations in the wireless network;
the wideband channel selection engine configured to combine the narrowband channel load metrics to obtain wideband channel load metrics for one or more wideband channels available to the AP;
the wideband channel selection engine configured to (1) weight a best narrowband channel load metric from the narrowband channel load metrics to define a weighted best narrowband channel load metric, and (2) determine a best wideband channel load metric from the wideband channel load metrics; and
the wideband channel selection engine configured to select a narrowband channel associated with the best narrowband channel load metric if the best wideband channel load metric is greater than the weighted best narrowband channel load metric.

12. The system of claim 11, wherein:
the wideband channel selection engine configured to select a channel associated with the best wideband channel load metric when the weighted best narrowband channel load metric is greater than the best wideband channel load metric.

13. The system of claim 11, wherein:
the wideband channel selection engine configured to tune the AP to a channel associated with the best wideband channel load metric when the weighted best narrowband channel load metric is greater than the best wideband channel load metric.

14. The system of claim 11, wherein:
the wideband channel selection engine configured to tune the AP to a channel associated with the best narrowband channel load metric when the best wideband channel load metric is greater than the weighted best narrowband channel load metric.

15. The system of claim 11, further comprising:
a plurality of function blocks having inputs and an output;
an N-to-1 multiplexor coupled to the plurality of function blocks;
an adder coupled to the N-to-1 multiplexor;
an auto-tuning engine coupled to the adder and the AP;
a first function block of the plurality of function blocks configured to receive a channel loading indicator for each relevant neighboring AP on a first channel as inputs and provides a first channel load metric for the first channel as output;
a second function block of the plurality of function blocks configured to receive a channel loading indicator for each relevant neighboring AP on a second channel as inputs and provides a second channel load metric for the second channel as output; and
the N-to-1 multiplexor configured to receive at least the first channel load metric and the second channel load metric as inputs and outputs a best channel load metric;
the adder configured to combine the best channel load metric and a tuning threshold;
the auto-tuning engine configured to:
receive the combined best channel load metric and tuning threshold and a current channel load metric associated with the AP; and
tune the AP to a channel associated with the best channel load metric when the combined best channel load metric and tuning threshold are indicative of better channel characteristics than the current channel load metric.

16. A method comprising:

receiving, by a device, channel loading indicators for a plurality of neighboring access points (APs);

computing a function for each of the channel loading indicators to define a channel load metric for each of channel load indicators;

combining a plurality of channel load metrics of the channel load metrics for each available channel to obtain a wideband channel load metric;

selecting a narrowband channel load metric from the channel load metrics, the narrowband channel load metric associated with a narrowband channel; and sending a signal indicative of the narrowband channel to optimize throughput for a wireless network when a weighted narrowband channel load metric is greater than the wideband channel load metric.

17. The method of claim 16, further including sending a signal indicative of a wideband channel associated with the wideband channel load metric when the narrowband channel load metric is greater than the wideband channel load metric.

* * * * *